United States Patent [19]
Ladner et al.

[11] Patent Number: 5,847,971
[45] Date of Patent: Dec. 8, 1998

[54] 3-D SPATIAL GUI QUERYING AND MANIPULATING AN RDMS FOR ORDER-ENTRY APPLICATIONS

[75] Inventors: Francis D. Ladner; Joseph R. Branc, both of Grand Rapids, Mich.

[73] Assignee: Steelcase Incorporated, Grand Rapids, Mich.

[21] Appl. No.: 583,471

[22] Filed: Jan. 5, 1996

[51] Int. Cl.⁶ .................................................. G06F 17/00
[52] U.S. Cl. ................................ 364/512; 1/1; 364/578
[58] Field of Search ..................................... 395/119, 919, 395/921, 961–968; 364/479.04, 225.4, 226.3, 282.1, 512, 578

[56] References Cited

U.S. PATENT DOCUMENTS

| | | | |
|---|---|---|---|
| 4,149,246 | 4/1979 | Goldman | 364/200 |
| 4,160,271 | 7/1979 | Grayson et al. | 364/400 |
| 4,275,449 | 6/1981 | Aish | 364/512 |

(List continued on next page.)

OTHER PUBLICATIONS

Microsoft Press, Computer Dictionary, Second Edition, p. 335, 1993.
On Trak Overview, Streamlining the planning and procurement of office furniture Steelcase Inc., 1991.
On Trak Specification Job Aid brochure, Oct. 1993.
Okamura Sales Promotion System brochure, Mar. 1, 1993.
Okamura Sales Promotion System brochure, 13 pages.
Abstract of Okamura Office Layout System, 1 page, Mar. 1, 1993.
OnTrak Overview, Streamlining the planning and procurement of office furniture, Steelcase Inc., 1991, 32 pages.
Technical Specifications: OnTrak, 2 pages, Copyright 1992 Steelcase inc., Revised Jun. 1993.
OnTrak Specification Job Aid brochure, dated Oct. 1993, 8 pages.
"New Program a 'Major Advance' in Design Softwware for Dealers", *Salesmarts* Jun. 26, 1992.
Goodrich and Fisher, "Computer–Aided Design as a Tool for Office Layout", Office Systems Research Journal, Spring 1994, pp. 23–32.
En Vision Workstation Visualization Software brochure, 6 pages, Mar. 1994.
En Vision Workstation Visualization Software brochure, 5 pages, 5 pages, Mar. 1994.
Novitski, "Furniture Visualization and Specification," *Interiors* May 1994.
Visions by Midmark, Documentation Manual, Table of Contents and pp. 1–152, Jul. 1993.
MicroStation Reference Guide, Version 5, pages 12–3 through 12–24, Sep. 1993.

*Primary Examiner*—Kevin J. Teska
*Assistant Examiner*—A. S. Roberts
*Attorney, Agent, or Firm*—Marshall, O'Toole, Gerstein, Murray & Borun

[57] ABSTRACT

A furniture specification system, designed for relatively large scale office furniture projects, having three basic components: 1) means for generating a furniture specification which contains data specifying a plurality of the available furniture products; 2) means for generating a visual display of the furniture products specified by the furniture specification on a display device; and 3) means for generating a cost specification based upon the furniture specification. Since both the visual display of the furniture products and the cost specification are generated from the same furniture specification, the possibility of discrepancies between the visual display and the cost specification is eliminated. The means for generating the furniture specification allows the user to add or delete individual products and to add product clusters to the furniture specification. After the products are selected, the user may select product finishes, such as wood grain finishes, furniture options, product keying information, and destination tags. After the project is specified, a quotation or purchase order may be automatically generated from the furniture specification.

16 Claims, 19 Drawing Sheets

U.S. PATENT DOCUMENTS

| | | | |
|---|---|---|---|
| 4,428,056 | 1/1984 | Schroeder et al. | 364/518 |
| 4,549,275 | 10/1985 | Sukonick | 364/521 |
| 4,642,780 | 2/1987 | Thomson | 364/512 |
| 4,685,070 | 8/1987 | Flinchbaugh | 364/522 |
| 4,700,317 | 10/1987 | Watanabe et al. | 364/488 |
| 4,747,074 | 5/1988 | Yoshida | 364/900 |
| 4,829,446 | 5/1989 | Draney | 364/488 |
| 4,905,094 | 2/1990 | Pocock et al. | 358/342 |
| 4,931,929 | 6/1990 | Sherman | 364/401 |
| 4,947,322 | 8/1990 | Tenma et al. | 364/401 |
| 4,961,154 | 10/1990 | Pomerantz et al. | 364/522 |
| 4,964,043 | 10/1990 | Galvin | 364/401 |
| 4,965,752 | 10/1990 | Keith | 364/522 |
| 4,972,318 | 11/1990 | Brown | 364/403 |
| 4,992,940 | 2/1991 | Dworkin | 364/401 |
| 5,053,956 | 10/1991 | Donald et al. | 364/401 |
| 5,109,337 | 4/1992 | Ferriter et al. | 364/401 |
| 5,111,392 | 5/1992 | Malin | 364/401 |
| 5,140,537 | 8/1992 | Tullis | 364/578 |
| 5,146,404 | 9/1992 | Calloway et al. | 364/401 |
| 5,148,154 | 9/1992 | MacKay et al. | 340/712 |
| 5,189,606 | 2/1993 | Burns et al. | 364/401 |
| 5,206,804 | 4/1993 | Thies et al. | 364/401 |
| 5,235,506 | 8/1993 | O'Brien, Jr. | 364/400 |
| 5,255,207 | 10/1993 | Cornwell | 364/512 |
| 5,255,352 | 10/1993 | Falk | 395/125 |
| 5,260,866 | 11/1993 | Lisinski et al. | 364/401 |
| 5,267,146 | 11/1993 | Shimizu et al. | 364/400 |
| 5,283,865 | 2/1994 | Johnson | 395/161 |
| 5,291,395 | 3/1994 | Abecassis | 364/401 |
| 5,293,479 | 3/1994 | Quintero et al. | 395/161 |
| 5,297,054 | 3/1994 | Kienzle et al. | 364/474.24 |
| 5,297,241 | 3/1994 | Hirr, Jr. et al. | 395/127 |
| 5,307,456 | 4/1994 | MacKay | 395/154 |
| 5,319,541 | 6/1994 | Blanchard et al. | 364/401 |
| 5,367,627 | 11/1994 | Johnson | 395/161 |
| 5,383,111 | 1/1995 | Homma et al. | 364/401 |
| 5,386,500 | 1/1995 | Pomerantz et al. | 395/119 |
| 5,398,195 | 3/1995 | Kim | 364/491 |
| 5,430,831 | 7/1995 | Snellen | 395/133 |
| 5,440,479 | 8/1995 | Hutton | 364/401 |
| 5,448,696 | 9/1995 | Shimada et al. | 395/161 |
| 5,451,998 | 9/1995 | Hamrick | 348/13 |
| 5,490,245 | 2/1996 | Wugofski | 395/159 |
| 5,579,231 | 11/1996 | Sudov et al. | 364/468.01 |

| 2035 Cordovan Walnut | ↑ | Wood Top/Plastic Edge (conf tbl) | ↑ | Apply |
|---|---|---|---|---|
| 2071 Amber Walnut | | Wood Top/Wood Edge (conf tbl) | | |
| 2084 Black Walnut | | Wood Top/Plastic Edge (aux tbl) | | TeamW |
| 2135 Penge over | | Wood Top/Wood Edge (aux tbl) | | |
| 2176 Myrtle over | | Top (satellite tbl) | | Group |
| 2177 Tulipwood over | | Top (service cart) | | |
| 2178 Golden Walnut | | Tabletop Lectern | | |
| Customer's own material | ↓ | Fifth Wall Outer Doors | ↓ | |
| Walnut Wood | | | | |

FIG. 18

PRODUCT LINE [TEAMWORK]    [GLOBAL] [NEXT] [ACCEPT]

FURNITURE                   OPTIONS

| Teamwork Conf. Tbl. Ped Base | ↑ | Plain Grommet | ↑ |
|---|---|---|---|
| TeamWork 5th Wall | | Pop-up Data Module | |
| TeamWork Conf. Tbl. Ped Base | | Pop-up 3 Power Module | |
| TeamWork Service Cart | ↓ | Pop-up 3 Power, Hard Wired | ↓ |

FIG. 20

3-D SPATIAL GUI QUERYING AND MANIPULATING AN RDMS FOR ORDER-ENTRY APPLICATIONS

BACKGROUND OF THE INVENTION

The invention is directed to a new three-dimensional graphical user interface for querying and manipulating a relational database management system for order-entry applications, more generally referred to herein as a furniture specification system, which allows a user to specify furniture products for a project and to generate a quotation or purchase order for the project and which displays the furniture which makes up the order or quotation.

The process of specifying furniture for large-scale projects, such as the furniture required for an entire floor or several floors of an office building, is extremely complicated and time-consuming. Traditionally, this process has required the assistance of highly trained individuals who must be knowledgeable about the numerous furniture products which are available, as described in voluminous furniture catalogs. Such catalogs, when stacked together, may exceed ten feet in thickness. The initial training period for such an individual may be on the order of several months, and the fact that the voluminous catalogs are periodically updated, such as every three months, essentially mandates that the training is never-ending. Mistakes in the furniture specification process can occur for a variety of reasons, including lack of familiarity with the furniture catalogs and use of outdated catalogs.

One conventional way of specifying a furniture project is to utilize a CAD system to generate the desired furniture layout and a separate specifier program to input the specifics needed to generate a purchase order. The process of creating the furniture layout typically takes months. After that period of time, when most of the desired furniture layout is determined, the list of furniture products in the furniture layout is moved to the specifier to add the information required for a purchase order. The process of creating the specification typically takes months also.

However, changes in the furniture layout are typically continually made by the customer, thus resulting in the need to simultaneously modify the data in both the CAD system and the specifier system. Due to the large number of changes that are typically made, and the need to manually update both the CAD system and the specifier system, errors are inevitably made, resulting in the furniture layout data in the CAD system being inconsistent with the data in the specifier system. Even if such inconsistencies are discovered, it may be difficult to determine which of the two systems accurately reflects the desired furniture layout.

Various systems for automating the specification of products have been proposed. U.S. Pat. No. 5,111,392 to Malin discloses a design system for creating furniture layouts. U.S. Pat. No. 5,255,207 to Cornwell discloses a method for designing and detailing cabinets. U.S. Pat. No. 5,293,479 to Quintero, et al. discloses a design tool which may be used to specify furniture projects.

SUMMARY OF THE INVENTION

The invention is directed to a furniture specification system which is designed for relatively large scale office furniture projects, such as the specification of all furniture products desired for an entire floor, or several floors, of an office building. The furniture specification system has three basic components: 1) means for generating a furniture specification which contains data specifying a plurality of available furniture products; 2) means for generating a visual display of the furniture products specified by the furniture specification on a display device; and 3) means for generating a cost specification based upon the furniture specification. Since both the visual display of the furniture products and the cost specification are generated from the same furniture specification, the possibility of discrepancies between the visual display and the cost specification is eliminated.

In one aspect, the invention includes a memory which stores a first set of data representing a plurality of available furniture products, a second set of data representing a plurality of product clusters, each of which includes a number of different types of products, and a third set of data representing a stored value for each of a number of furniture attributes for each product cluster. The means for generating the furniture specification prompts the user to input an upper value and a lower value for one of the furniture attributes, searches the memory to locate each product cluster for which the stored value for the furniture attribute input by the user is within a range defined by the upper and lower values input by the user, and generates a visual display which identifies each product cluster located in the search.

The product clusters may include substantially all of the available furniture products that are required to complete an office space, such as a single enclosed office, or a conference room. The product clusters may be selected based on attributes such as cost and number of primary occupants. After one of the product clusters is selected by the user, any undesired products within the cluster can be deleted.

In another aspect, the invention allows the user to assign destination tags to the furniture products specified by the furniture specification, each of the destination tags specifying a destination to which one of the furniture products is to be delivered. After the destination tags are assigned, the furniture specification is automatically updated with data representing the assigned destination tags. Each of the destination tags may identify an area, project, person, etc. within a building to which a furniture product is to be delivered.

The destination tags may be assigned by selecting a plurality of products, such as via a boundary which encloses a number of products displayed by the display means, and a destination tag may be automatically assigned each selected product.

In a further aspect of the invention, the means for generating the furniture specification allows the user to select a furniture product for which a lock may be provided and which is specified by the furniture specification and to input keying information for that furniture product. The keying information is then automatically included in the furniture specification for the selected product. Preferably, the keying information is shown in the visual display of the selected product.

In another aspect of the invention, the means for generating the furniture specification allows the user to select a plurality of products specified by the furniture specification, such as by enclosing them within a boundary, and to select a furniture option for the selected products. The furniture option is then automatically assigned to the selected products.

In a further aspect of the invention, the means for generating a furniture specification allows the user to select a furniture finish, such as a wood grain finish or a fabric finish, for one of the furniture products. The display means then generates a visual display of the selected finish from a raster image which represents the actual visual appearance of the selected finish.

In another aspect of the invention, the system includes a memory for storing finish data relating to a plurality of furniture finishes and cost data which specifies a cost associated with one of the finishes; the means for generating the furniture specification allows the user to select one of the finishes for one or a plurality of the products; the display means displays the selected finish on the product; and the means for generating the cost specification determines the cost of the furniture products, taking into account the cost of the selected finish.

In a further aspect of the invention, the furniture specification includes a number of products marketed by a first vendor and a number of products marketed by a second vendor different than the first vendor, and the means for generating a cost specification allows the user to generate separate cost specifications for each of the different vendors. The cost specifications may include, for example, quotations and purchase orders.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 18 illustrates a menu used in connection with the assign finishes routine;

FIG. 20 illustrates a menu used in connection with the assign options routine;

DETAILED DESCRIPTION OF A PREFERRED EMBODIMENT

Figure 1:
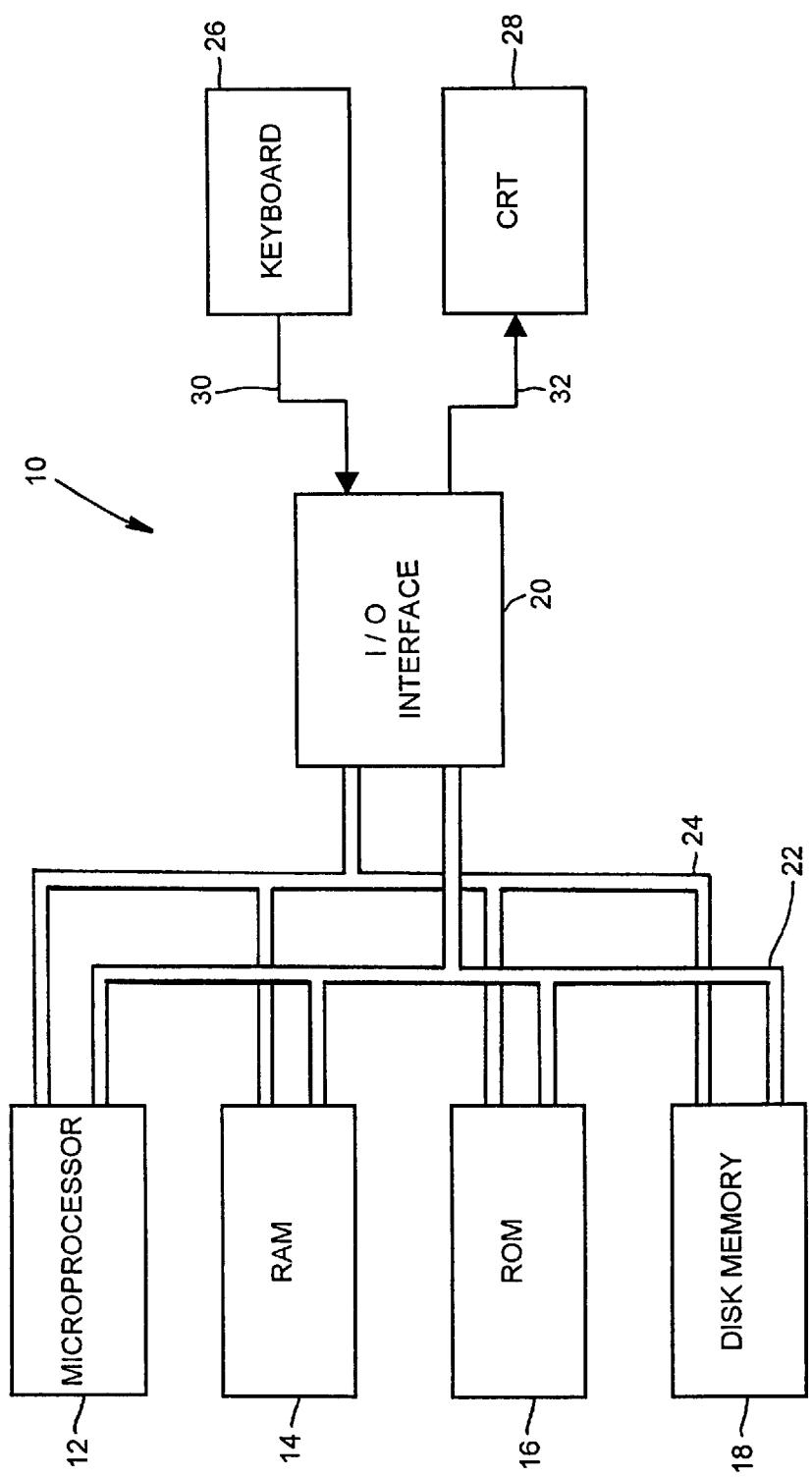
FIG. 1 is a block diagram of the computer hardware components of a preferred embodiment of a furniture specification system in accordance with the invention.

A block diagram of a preferred embodiment of the computer hardware components of a furniture specification system 10 in accordance with the invention is illustrated in FIG. 1. The system 10 is an interactive system that may be used to completely specify the locations and characteristics of the furniture products, such as desks, chairs, conference tables, etc., being ordered for a project, which could include all furniture products required for a complete floor of an office building, or multiple floors of an office building, for example.

The system 10 generates visual displays, which may be two-dimensional or three-dimensional views, that illustrate all of the furniture products selected by the user for a particular project. The views may be enlarged or reduced so that the entire project, or portions of the project, may be viewed at any time, and the furniture products may be viewed from any angle. The visual appearance of the selected furniture products displayed by the system 10 is identical to that of the actual furniture products. The visual displays generated by the system 10 include, for example, the wood grain finishes and fabrics specified for the furniture products.

The system 10 also has the capability to generate written cost specifications, such as quotations or purchase orders, for the furniture products that are selected. The system 10 is designed so that there is a direct one-to-one correspondence between the furniture products for a project that are displayed to the user and the furniture products set forth on a quotation or purchase order generated for the project. Thus, the design of the system prevents the generation of a quotation or purchase order that is inconsistent with the visual display of the furniture products presented to the user, one example of such an inconsistency being a furniture item set forth on a purchase order that is not displayed to the user on the visual display.

Referring to FIG. 1, the system 10, which may be implemented on a conventional personal computer system, has a microprocessor 12, a random-access memory (RAM) 14, a read-only memory (ROM) 16, a disk memory 18, such as a hard disk, and a conventional I/O interface 20, all of which are interconnected in a conventional manner via an address bus 22 and a data bus 24. A keyboard 26 and a display device 28, such as a cathode ray tube (CRT), are connected to the I/O interface 20 via a pair of data links 30, 32.

The operation of the system 10 is controlled by a number of computer programs, which may be stored in the disk memory 18, that are executed by the microprocessor 12. These computer programs include a conventional relational database program, such as one commercially available from Oracle Corp., a conventional computer-aided design (CAD) program, such as one commercially available from Bentley Microstation, and an application program specifically designed for the system 10 which controls the specification and display of the furniture products and the generation of quotations and purchase orders.

Initial Data Organization

Figure 2:
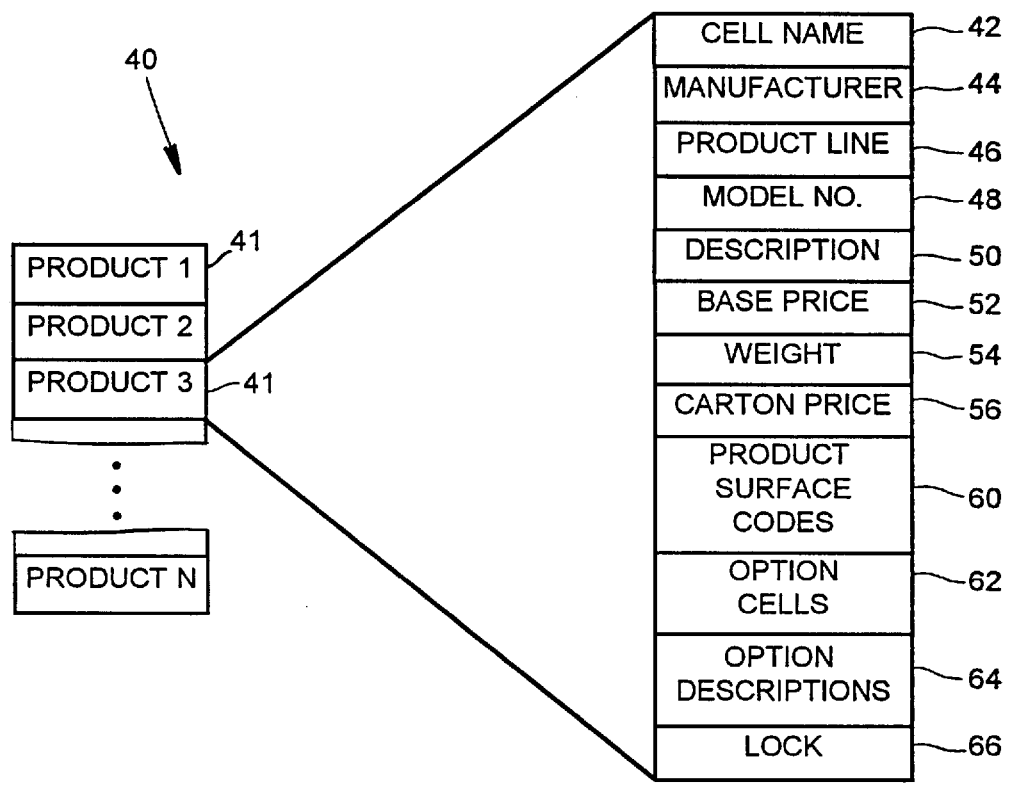
FIG. 2 illustrates a product database in which data relating to the furniture products that may be specified by the system is stored.

Prior to the use of the system 10, the disk memory 18 is pre-loaded with product data and graphics data relating to the furniture products that may be specified using the system 10. Referring to FIG. 2, that pre-loaded data includes a product database 40 having a product data record 41 for each furniture product, such as a desk, a chair, a conference table, etc, that may be specified using the system 10. The product database 40 may be provided with every product currently available so that the database 40 effectively replaces the voluminous catalogs.

As shown in the right-hand portion of FIG. 2, each product record 41 has a number of data fields, including a data field 42 in which the cell name corresponding to the product is stored. Each furniture product that may be specified has a unique cell name which identifies a set of graphics data used to display a representation of the product on the display device 28.

The manufacturer or vendor of the product is identified in a data field 44; the product line is identified in a data field 46; and the model number of the product is stored in a data field 48. A description of the product is stored in a data field 50; the base price and weight of the product are stored in a pair of data fields 52, 54; and a data field 56 stores an incremental packaging price if the product is to be enclosed in a cardboard carton when shipped.

A data field 60 includes a plurality, such as eight, surface codes that identify various surfaces of the product. For example, where the product is a desk, each surface code might specify a different surface (not necessarily planar) of the desk, such as the top surface, the front surface, the trim on edges around the top surface, the faces of the drawers, etc. As described below, these surface codes are utilized, for example, during the assignment of various finishes to the various surfaces of a product. For example, a desk might have a wood grain top and painted metal drawers.

A data field 62 includes a plurality, such as ten, of a number of option cell names which identify the options that are available with the product. A data field 64 contains a textual description of each option in the data field 62. A data field 66 contains a flag indicating whether or not the product comes with a lock (e.g. such as a desk with locking drawers).

Figure 3:
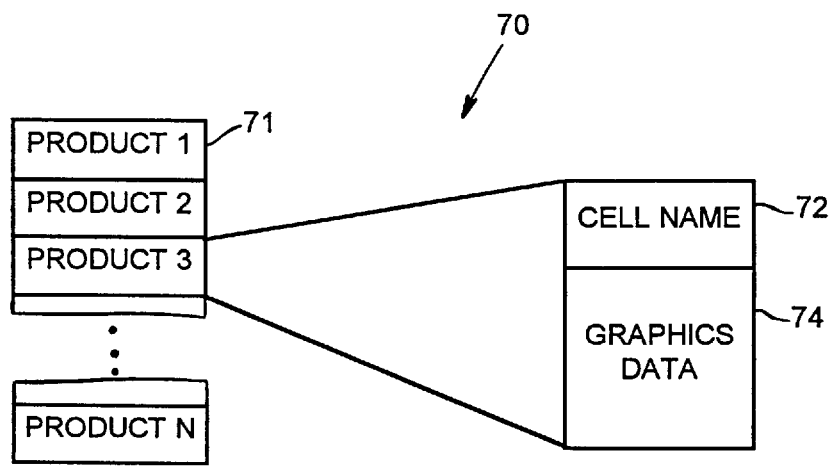
FIG. 3 illustrates a graphics database which contains graphics data from which the system generates visual displays of the furniture products.

FIG. 3 illustrates a graphics database 70 (referred to as a "cell library" in the CAD program), stored in the disk memory 18, that is used by the CAD program to generate two- and three-dimensional visual displays of the products selected. For each product that may be selected by the user, the graphics database 70 has a data record 71 having a data field 72 in which the cell name corresponding to the product is stored and a data field 74 containing graphics data from which the CAD program can generate a visual display of the product. The cell name in the data field 72 acts essentially as an address or pointer to the associated graphics data in the data field 74.

Figure 4:
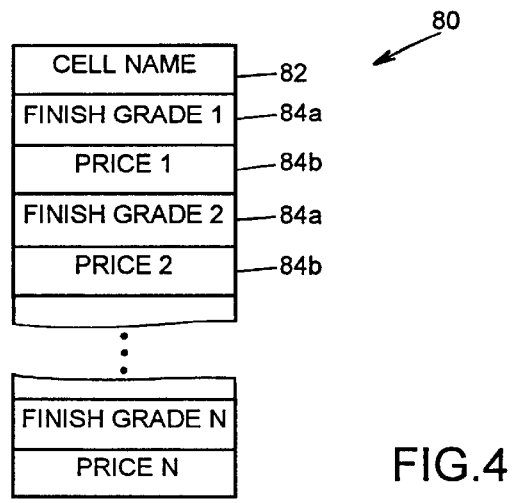
FIG. 4 illustrates data relating to various finish grades that are available for the furniture products.

FIG. 4 illustrates a finish grade table 80 for a product which specifies all possible finish upgrades for a particular furniture product (not all products have finish grade options). For example, a desk may have three possible finish upgrades: 1) a simulated wood surface for the top of the desk; 2) a wood veneer surface for the top of the desk; and 3) a solid wood finish for the desktop. As shown in FIG. 4, the finish grade table 80 has a data field 82 which specifies the cell name of the product and a plurality of data fields 84a, 84b which identify, respectively, all possible finish upgrades and their corresponding incremental prices (i.e. prices which are added to the product base price set forth in data field 52 of FIG. 2) for the product identified by the cell name set forth in data field 82.

Figure 5:
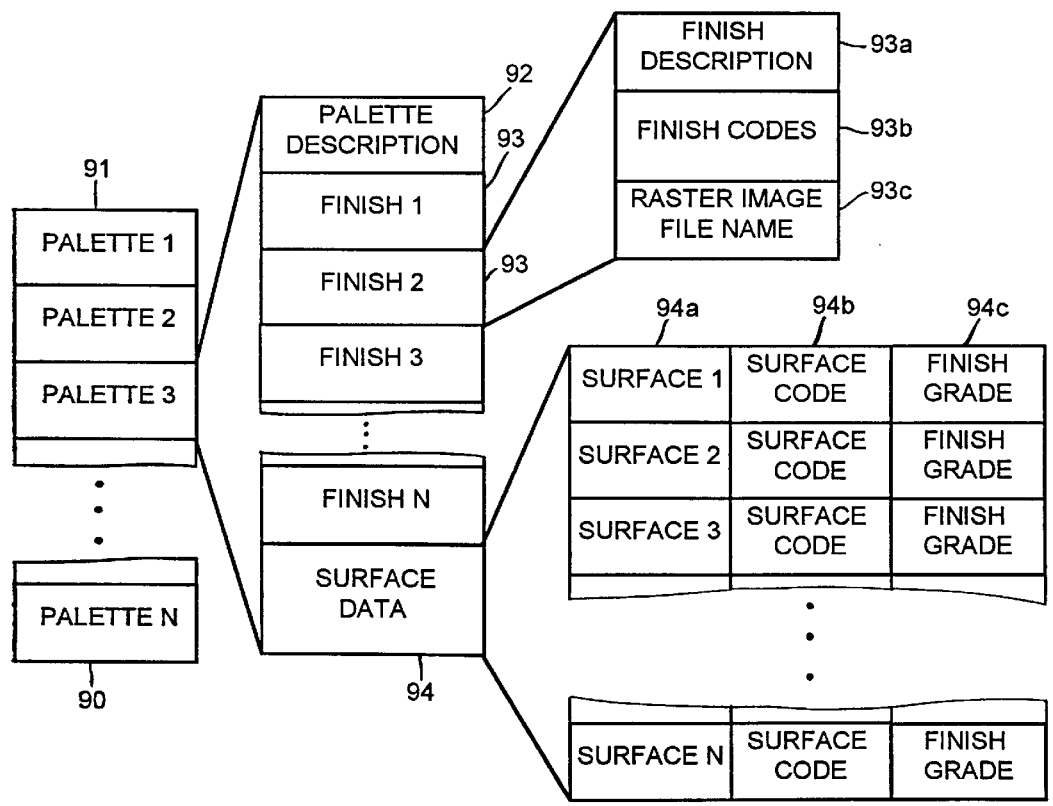
FIG. 5 illustrates a database which contains data regarding product finishes from which the system generates visual displays of the various finishes that are available for the furniture products.

FIG. 5 illustrates a database 90 containing data which specifies various finishes, such as wood grain finishes or fabric finishes, that may be provided on the furniture products. The database 90 has a plurality of data records 91, each of which corresponds to a palette of finishes which is available for a particular product line. Each data record 91 has a data field 92 containing a textual description of one of the palettes, a plurality of finish data records 93, and a surface data file 94. For example, one of the palette records 91 might have data for a number of walnut wood grain finishes, with each of the data records 93 containing data specifying a respective one of the walnut finishes. Each data record 93 contains a data field 93a having a textual description of the finish, a data field 93b having various finish codes stored therein, and a data field 93c having a file name for a raster image of that particular finish.

The purpose of the finishes database 90 is to allow the system 10 to visually display the specified products exactly as they would actually appear in real life. Thus, the user is able to evaluate the aesthetics of various combinations of furniture products when specifying the project. To that end, the finish codes stored in data field 93b, which are specified by the conventional CAD program, may include various coefficients which are used to display the products more realistically, including for example a reflection coefficient (e.g. a fraction between 0 and 1) which is used to specify the reflectivity of a particular finish.

To make the appearance of the products appear realistic, a raster image data file is generated for each finish prior to the use of the system 10. Each raster file is essentially an electronic copy of the actual appearance of a corresponding finish. The raster files, which are created in a conventional manner by drawing a scanner across the actual product finishes and storing the resulting digitized images in the disk memory 18, are accessed using the raster image file name stored in the data fields 93c.

The surface data file 94 is composed of data for each of the product surfaces to which one of the finishes specified in the data records 93 may be assigned. The textual definition of each product surface, such as "Wood Top/Plastic Edge," is stored in a data field 94a, the surface code corresponding to that product surface is stored in a data field 94b, and the finish grade code corresponding to that surface is stored in a data field 94c.

When using the system 10, furniture products may be selected one-by-one or in groups of products called clusters. For example, a cluster may include all furniture products necessary for a given area, such as a single office, a number of adjacent offices, or a conference room. The cluster for a single office may include a desk, a desk chair, a desk lock, a credenza, a conference table, conference table chairs, any necessary electrical wiring products, and any necessary lighting products. Selecting clusters of products instead of individual products is advantageous since it speeds up and simplifies the furniture specification process. After a cluster is selected, any individual products within the cluster that are not desired by the user can be deleted via the delete products routine 206.

Figure 6:
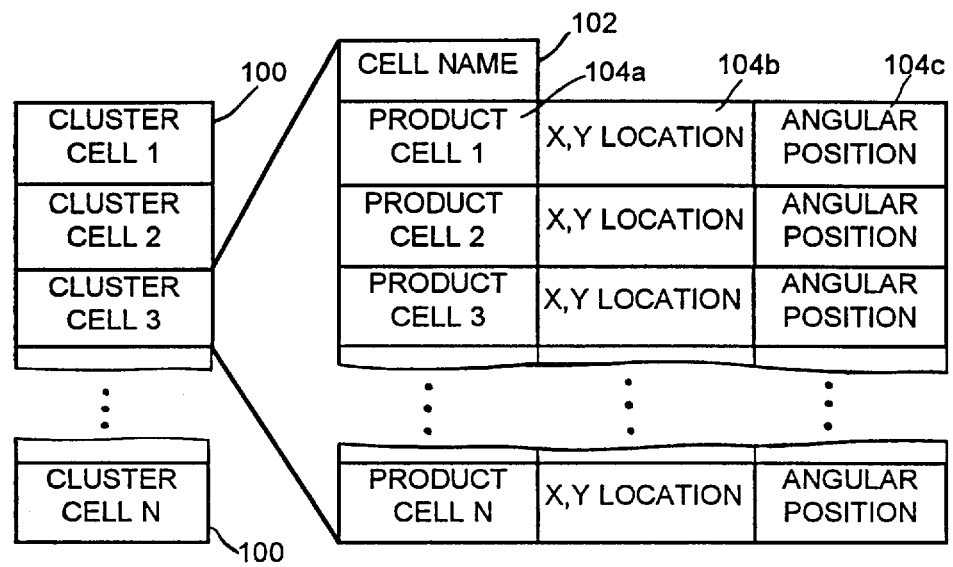
FIG. 6 illustrates a number of cluster records containing data relating to the visual display of predefined clusters of furniture products that may be specified by the user.

FIG. 6 illustrates a group of cluster records 100, each of which is composed of a data field 102 in which the cell name of the cluster is stored and a plurality of data fields 104*a*–104*c* which contain data relating to each of the products which are part of the cluster. In particular, for each product, the data field 104*a* stores the cell name of the product, the data field 104*b* stores x-y position data which specifies the relative x, y position of the product within the boundary of cluster, and the data field 104*c* stores angular position data which specifies the relative angular position (which may vary between 0° and 360°) of the product within the cluster.

The design of the system 10 allows the user to select clusters based upon different attributes, such as price. For example, the system 10 may be pre-loaded with data representing 1000 different furniture clusters, 350 of which are furniture clusters for a single office, 250 of which are clusters for conference rooms, etc. In order to determine which of the 1000 clusters might be desired by the user, the user may enter a plurality of attributes which define what is acceptable to the user. Then, based on the selected attributes, only those clusters which are satisfactory are presented to the user.

Figure 7:
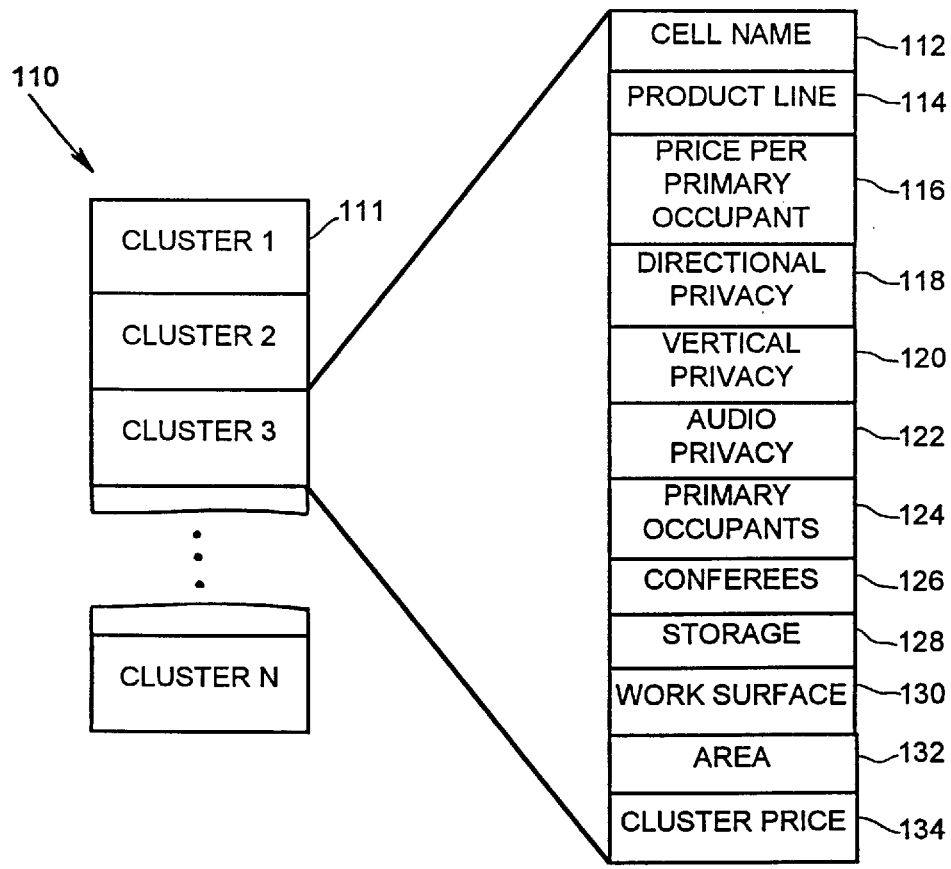
FIG. 7 illustrates a cluster database having data relating to predefined clusters of furniture products.

FIG. 7 illustrates a cluster search table 110 having a data record 111 for each cluster defined in the system 10. Each cluster record 111 has a data field 112 that stores the cell name for the cluster (for the same cluster, the cell name stored in data field 112 would be the same as the cell name stored in data field 102 in FIG. 6) and data fields 114–134 that store the attributes of the cluster. In particular, a data field 114 stores the name of the product line (this assumes different product lines are available), and a data field 116 stores the price per primary occupant, which is the total price of all products which make up the cluster divided by the number of primary occupants (e.g. for a one-person office, the number of primary occupants would be one).

A data field 118 contains data regarding the amount of "directional privacy," such as one-way, two-way, three-way, or four-way directional privacy. For example, an office with a door would have four-way directional privacy, whereas a working space formed of movable dividers in three directions would have three-way directional privacy. A data field 120 contains data regarding "vertical privacy," which for a working area formed of movable dividers could be height of the dividers. A data field 122 stores a flag indicating the degree to which the cluster has "audio privacy." An office with a door would have high audio privacy, whereas a working area formed by movable dividers would have low audio privacy.

A data field 124 specifies the number of primary occupants for the cluster, and a data field 126 specifies the number of conferees (e.g. in an office having a conference table, the number of conferees would be the maximum number of persons who could sit at the conference table). A data field 128 stores the cubic storage area (e.g. storage area in desks, credenzas, cabinets, etc.) per primary occupant, and a data field 130 stores the area of the work surface (e.g. the top of a desk) per primary occupant. A data field 132 stores the total area (in square feet) occupied by the cluster, and a data field 134 stores the total price of all furniture products which make up the cluster.

The databases described above in connection with FIGS. 2–5 may be periodically updated, and the updated databases may be sent to the various users of the system 10 via electronic media to eliminate the need for voluminous printed catalogs describing the products.

Overall Operation

Figure 8:
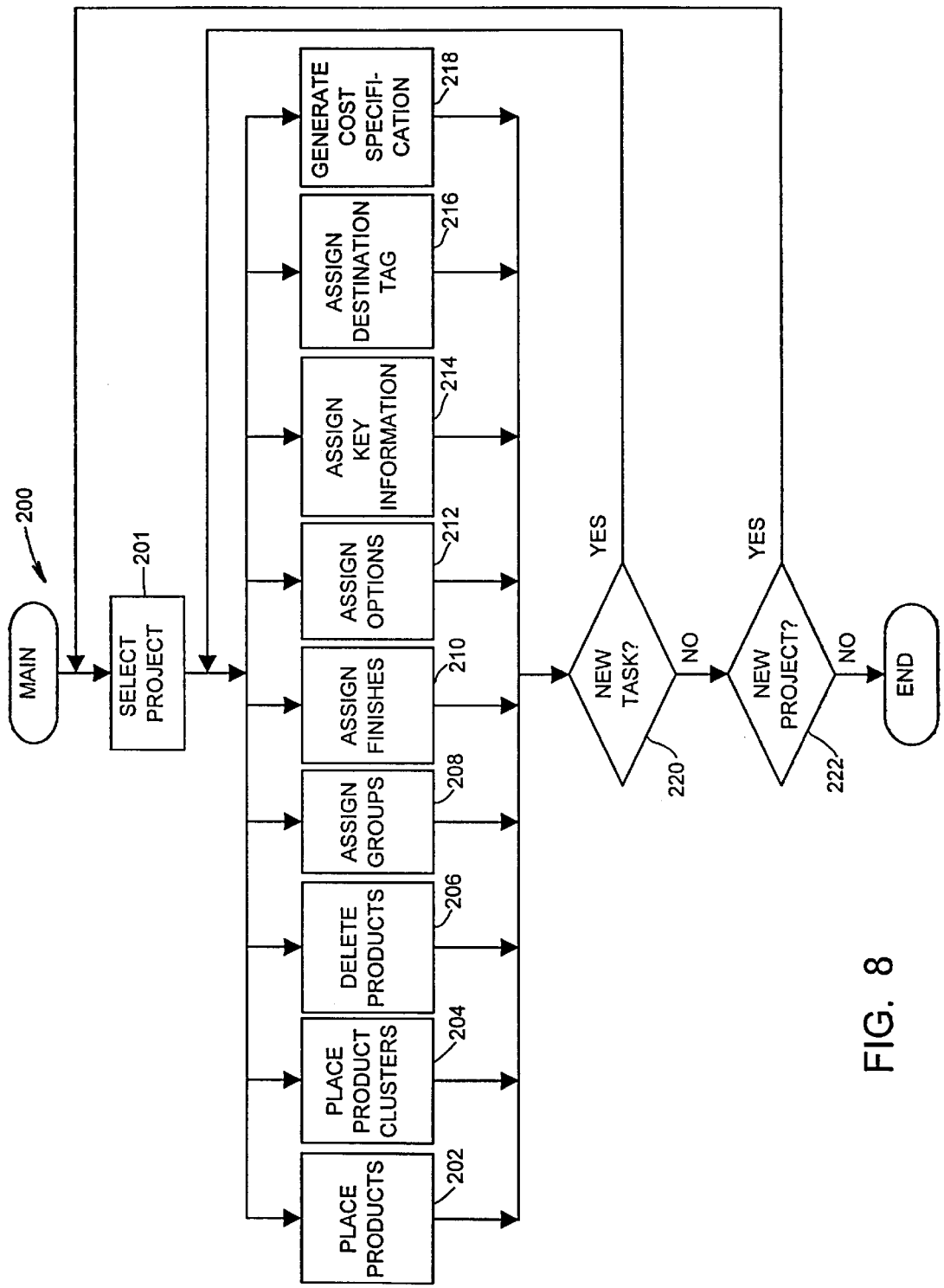
FIG. 8 is an overall flowchart of the application program which controls the operation of the system.

An overall flowchart 200 of the application program is shown in FIG. 8. After the system 10 is provided with the data representing the furniture products and clusters as described above, the system 10 may be used to specify the furniture products wanted by a customer for a project. The system 10 may be used together by a customer and a user trained on the system 10, or by a customer alone.

Referring to FIG. 8, at step 201 the user selects a project. This may be a project which the user previously started to specify, a project that has already been completely specified but for which modifications are to be made, or a new project that has not been started yet.

After a project is selected, a number of computer program routines 202–216 are utilized to specify the furniture products for the project, and then a generate cost specification routine 218 may be utilized to issue a written cost specification, such as a purchase order or a quotation. Although the routines 202–218 are generally utilized in order from left-to-right as shown in FIG. 8 when a project is being specified, the routines may be utilized in any order.

A routine 202 allows the user to select individual products and place them at desired locations within a defined space, such as the floor of an office building; a routine 204 may be utilized to select and place product clusters within the defined space; and a routine 206 may be used to delete products from the defined space. After the products are selected utilizing the routines 202–206, the characteristics of the products, such as surface finishes, options, keys, and destination tags, are assigned via the routines 208–216, and after the project is completely specified, a quotation or purchase order may be generated via a routine 218.

After one of the routines 202–218 is used, if a new task is requested by the user at step 220, the program branches back to one of the routines 202–218. If the user does not wish to utilize another one of the routines 202–218, the program branches to step 222 at which another furniture project can be requested, in which case the program branches back to step 201 where another project is selected.

Figure 9:
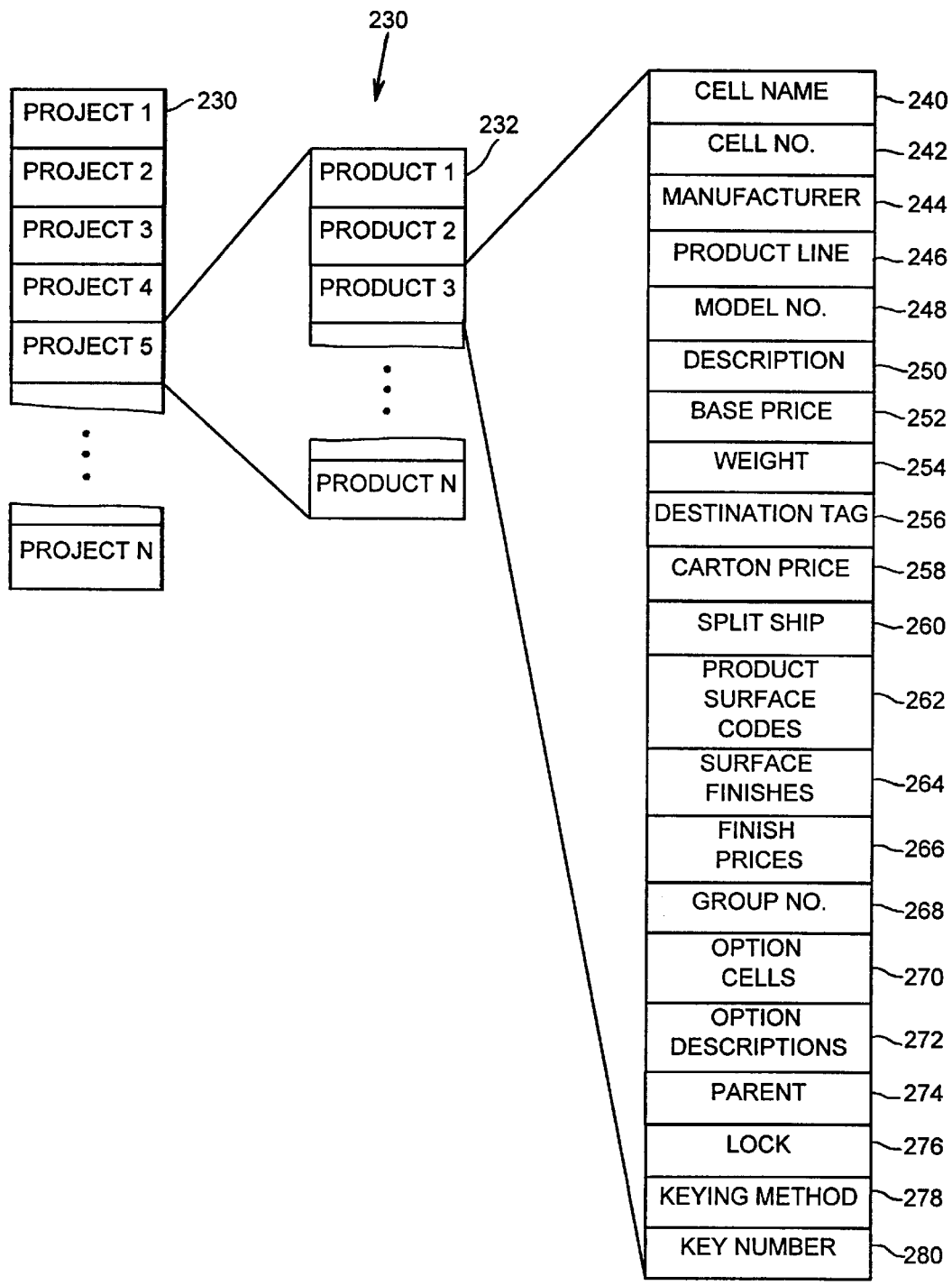
FIG. 9 illustrates a project data file which is generated by the system during selection of furniture products by the user.

During the operation of the routines 202–216, for each project that is specified a project data file 230 is created. A number of project files 230 are shown in FIG. 9. Each project file 230 contains a data record 232 for each product that is selected for inclusion in the project. As shown in the right-hand column of FIG. 9, the data record 232 for each product has a number of data fields 240–280.

Some of the data fields 240–280 correspond to some of the data fields 42–66 of the product records 41 (shown in FIG. 2), and only the new data fields of the data records 232 are described below. A data field 242 contains a number which uniquely identifies each product selected by the user (the cell name does not uniquely identify a product since it identifies the type of product, and there can be a number of identical products selected by the user). A data field 256 contains a destination tag selected by the user which specifies where the furniture product is to be delivered. The destination tag can specify any name for a destination, for example, a particular conference room or a person's office. A data field 260 specifies whether a product is to be split-shipped, i.e. shipped separately, or shipped only when all the other products in the project are ready for shipment.

For each product surface defined by the surface codes set forth in the data field 60 of the product database 40 (FIG. 2), a data field 264 specifies the corresponding finish, such as a particular type of walnut finish, selected by the user. A data field 266 stores, for each product surface, the corresponding incremental finish price. To facilitate the efficient assigning of various finishes to products, the user may divide the products into individual groups, and simultaneously assign the same finishes to all products in the same group. The user-assigned group number is stored in a data field 268.

A product specified by one of the data records 232 may be an option item, such as a shelf that is incorporated into a cabinet. The cabinet and each of the shelves within the cabinet will each have a separate data record 232 in the project file 230. Where a data record 232 is for an option item, the identity of the product, or "parent," in which the option item is to be incorporated is identified in a data field 274.

A data field 278 stores a user-selected keying method which specifies how key numbers are to be assigned, e.g. consecutively or randomly, and a data field 280 contains a key number.

Figure 10:
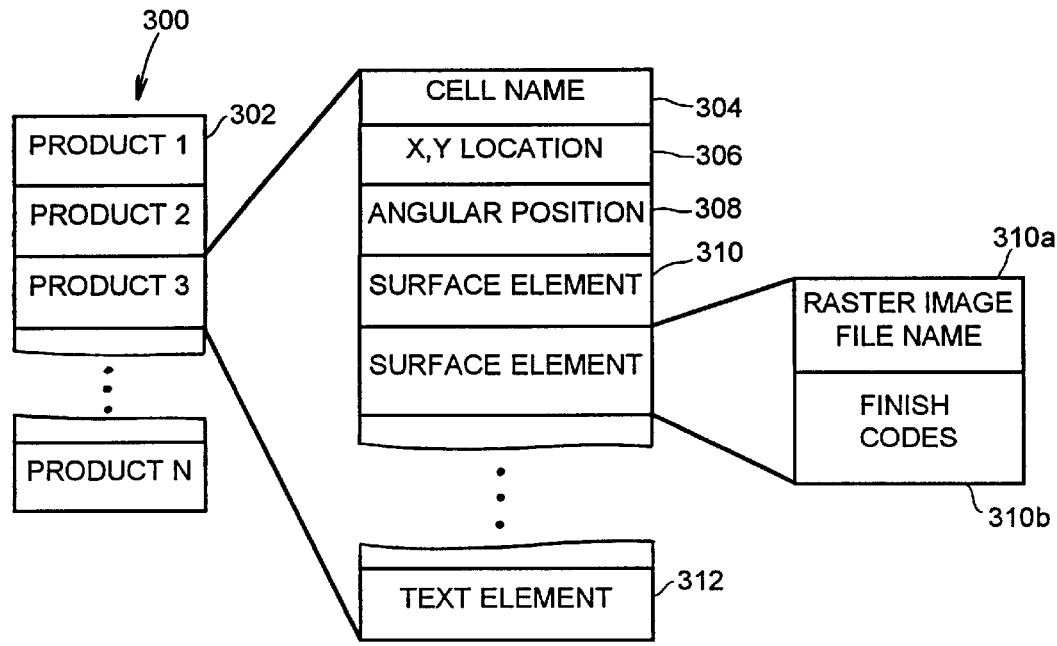
FIG. 10 illustrates a graphics data file which is generated by the system during selection of furniture products by the user.

A graphics file 300 is used by the CAD program to generate the three-dimensional display of the furniture products selected by the user. Referring to FIG. 10, the graphics file 300 has, for each product selected by the user, a data record 302 composed of a data field 304 having the cell name of the product, a data field 306 in which user-selected x-y location information is stored, a data field 308 in which user-selected angular position data is stored, a number of data fields 310 which specify the surface elements which make up the product, and one or more data fields 312 which store textual information that may be printed over a predetermined portion of the three-dimensional display of the product. Each data field 310 includes a data field 310a which stores a raster image file name for the user-selected finish for that surface element and a data field 310b having a set of finish codes for that surface element.

Each time a user selects a product or product cluster for addition to the system, or deletes a product from the system, the project and graphics files 230, 300 are updated so that they always contain a complete specification of the currently specified furniture products. Also, there is a one-to-one correspondence between the products included in one of the project files 230 and the products included in the graphics file 300 associated with that project file 230 so that the furniture products are displayed only if they are included in the project file 230, and vice versa.

Placement of Products

Figure 12:
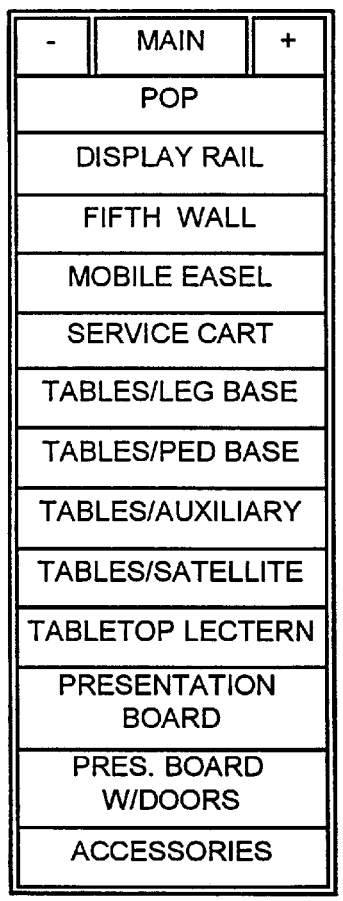
FIG. 12 illustrates a portion of a product placement menu that is displayed to the user.
Figure 11:
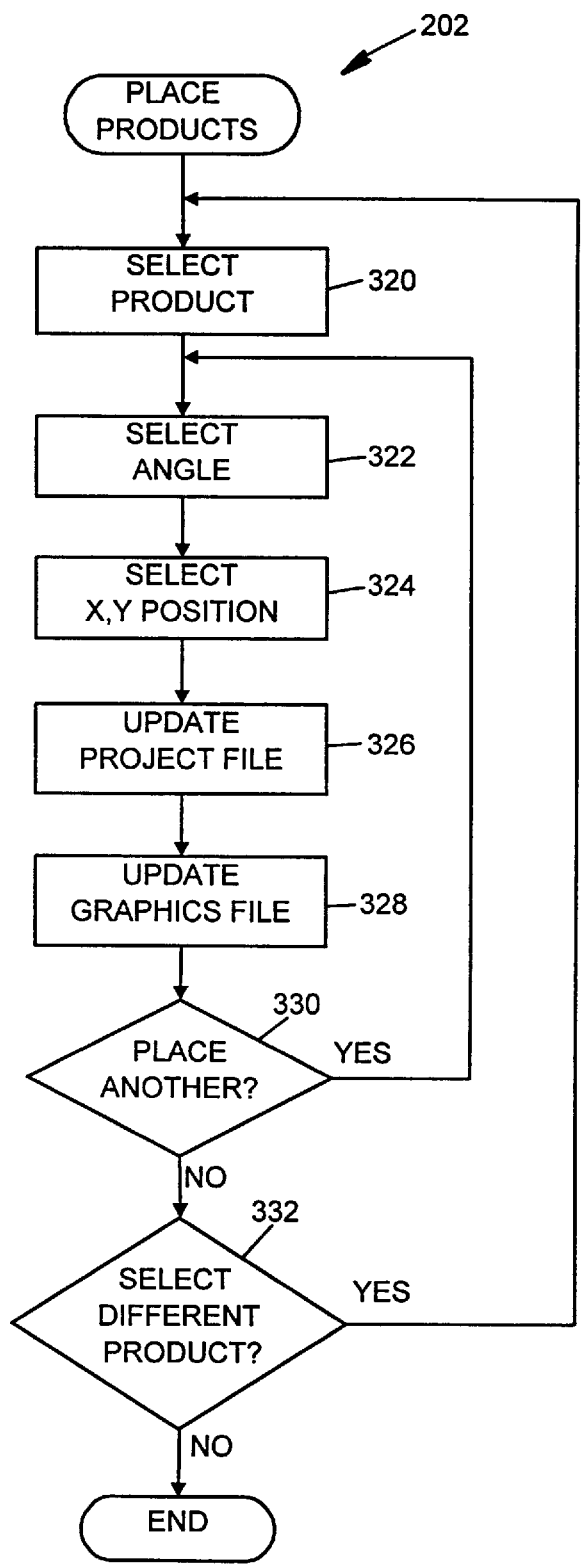
FIG. 11 is a flowchart of the "place products" routine shown schematically in FIG. 8.

A flowchart of the place-products routine 202 shown schematically in FIG. 8 is illustrated in FIG. 11. This routine 202 is used with a menu that is displayed on the display device 28 which, as shown in FIG. 12, contains a list of the individual products which may be placed by the user. The list can be scrolled up or down so that only a portion of the list is visible at one time. Alternatively, the list of products could be presented in a hierarchical set of menus having a main menu heading which displays a plurality of product types, e.g. desks, chairs, tables, cabinets, etc., and upon selection of a product type, displays a submenu which lists all products available for that product type. The particular design of the menu system is not important to the invention.

Referring to FIG. 11, at step 320 the user first selects a product using the product menu displayed on the display device 28. For example, this may be done by positioning a computer mouse over the desired product and clicking the mouse once. At step 322, the angle at which the product is to be positioned within the defined space is selected by the user via the mouse in a conventional manner, such as by moving the mouse in a circle to alter the angle at which the product is displayed.

Referring to FIG. 11, after the angle is selected, the x-y position of the product within the defined space is selected via the mouse at step 324. The product may be visually "attached" to the mouse so that the product moves along with the mouse as the user moves it (the display of the product is accomplished via the CAD program based upon the graphics data in the data field 74 (FIG. 3) associated with the product selected by the user). When the desired x-y position is reached, the user may click the mouse to select that x-y position.

At step 326, the project file 230 shown in FIG. 9 is updated. This update consists of adding a product record 232 for the product just placed by the user. This is accomplished by creating the data fields 240–280 shown in FIG. 9, and copying the data in the data fields 42–66 of FIG. 2 for the product just placed to the corresponding data fields 240–280 in the new product record 232. In particular, the cell name in data field 42 is copied to data field 240; the manufacturer in data field 44 is copied to data field 244; and so on (the cell number in data field 242 is automatically assigned by the CAD program).

Referring back to FIG. 11, at step 328 the graphics file 300 shown in FIG. 10 is updated. This is accomplished by adding a graphics record 302 for the selected product to the graphics file 300. The cell name of the product selected by the user is stored in the data field 304, and the x-y and angular positions selected by the user are stored in the data fields 306, 308, respectively.

Referring back to FIG. 11, at step 330, if the user desires to place the same product at other locations within the defined space, the program branches back to step 322. If not, the user may select a different product for placement at step 332, in which the program branches back to step 320.

Placement of Product Clusters

Figure 13:
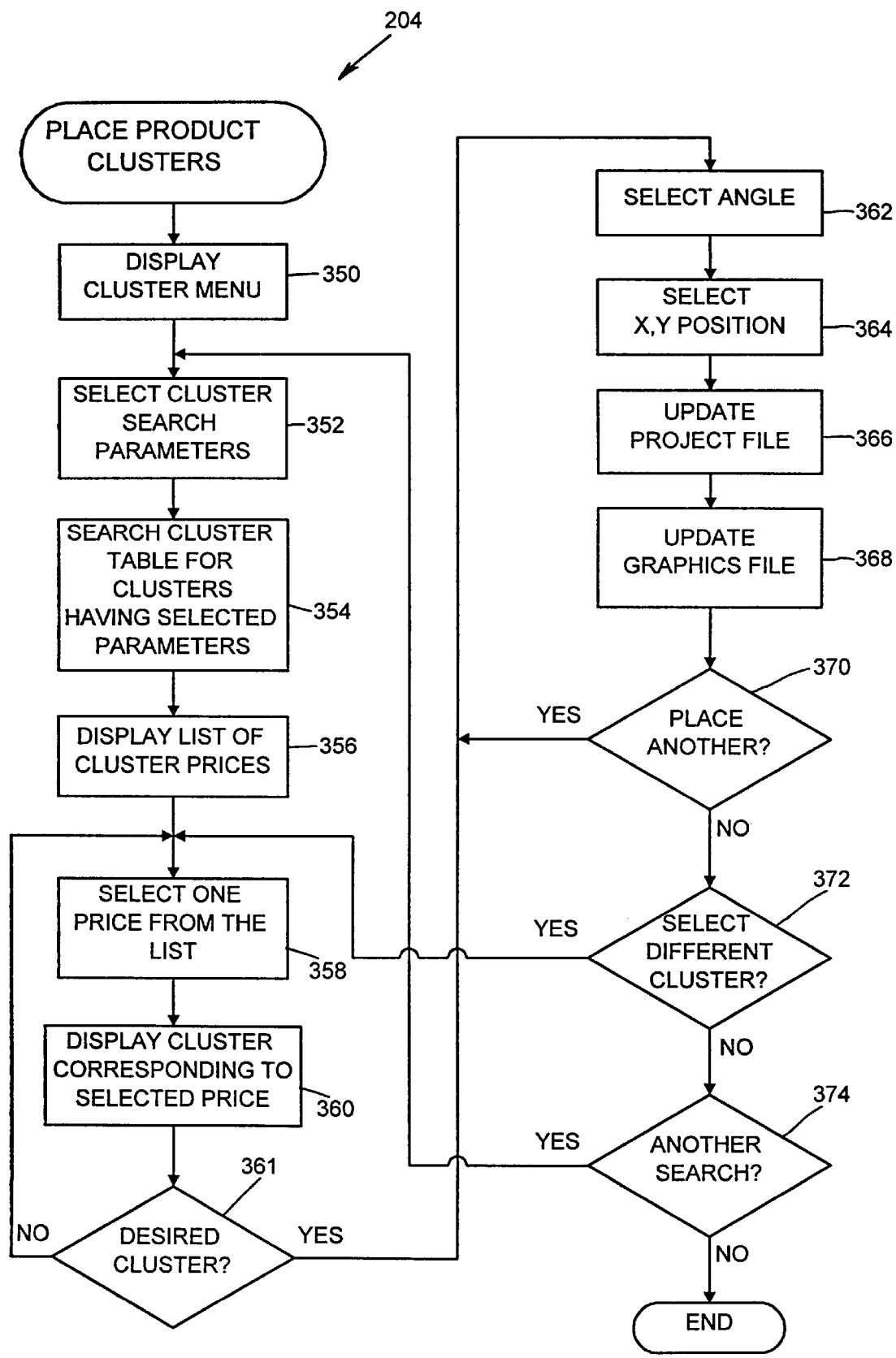
FIG. 13 a flowchart of the "place product clusters" routine shown schematically in FIG. 8.

A flowchart of the place-clusters routine 204 shown schematically in FIG. 8 is illustrated in FIG. 13. As described above, the user may search all of the product clusters that are available via a number of attributes, such as price, to determine which cluster is most desirable.

Figure 14:
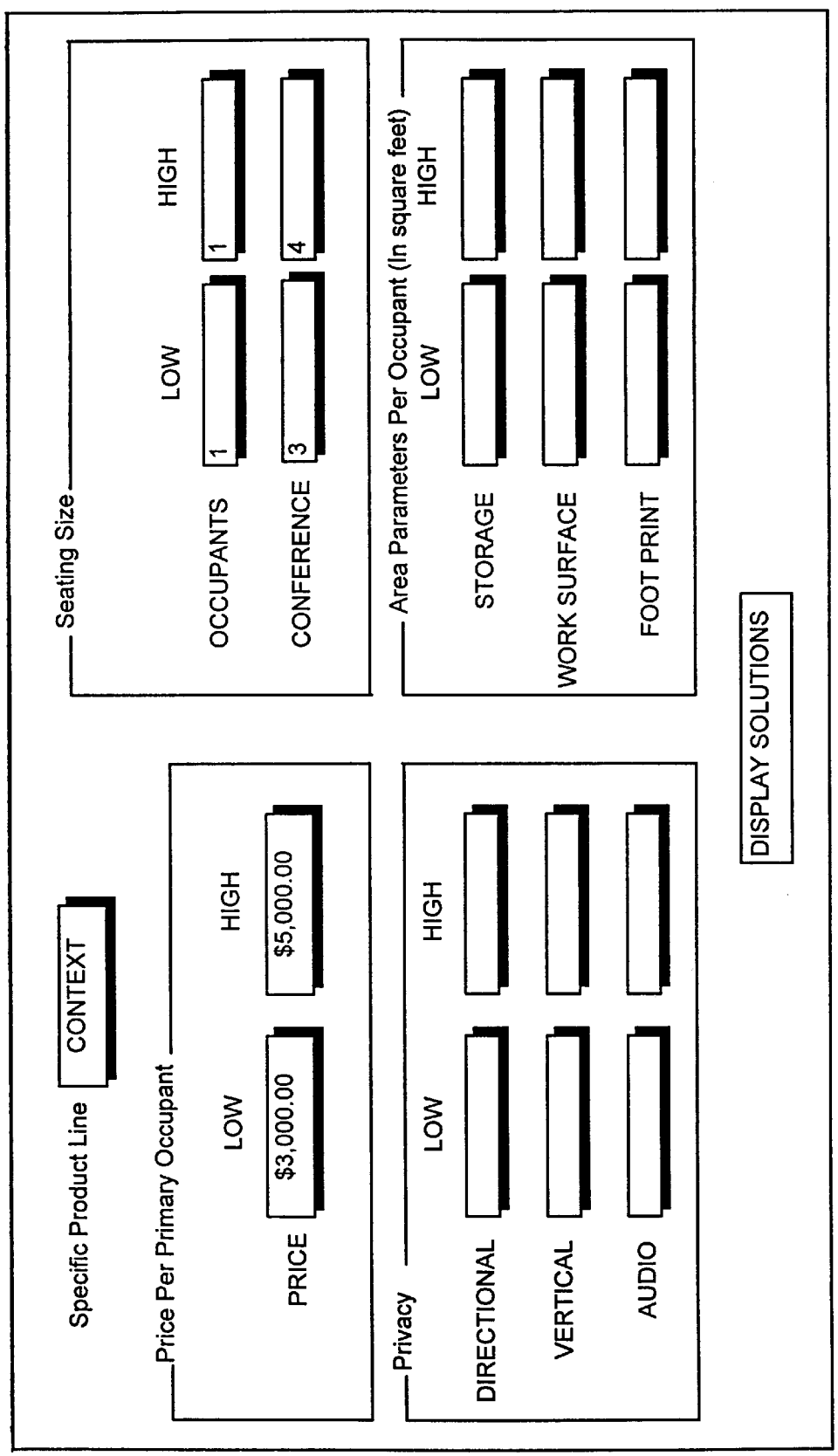
FIG. 14 illustrates a portion of a cluster menu that is displayed to the user.

At step 350 of FIG. 13, a cluster menu is displayed on the display device 28. As shown in FIG. 14, for all but one of the searchable attributes set forth in the cluster search table 110 described above and illustrated in FIG. 7, the cluster menu contains a pair of data entry boxes, one for a high limit and one for a low limit. For the product line attribute, the cluster menu has only a singly data entry box in which the user specifies the desired product line. The user does not have to specify all of the attributes in the cluster menu before the search is performed. The cluster search is not limited by any data entry boxes left blank.

After the user enters the desired cluster search parameters at step 352 of FIG. 13, the cluster search table 110 (FIG. 7) is searched at step 354 to locate all product clusters whose attributes match those specified by the user via the cluster menu. For example, for the selected attributes shown in FIG. 14, the data fields 114, 116, 124 and 126 in the cluster search table 110 would be searched to locate all clusters in the Context product line having a price per primary occupant of between $3,000 and $5,000 and which were intended for a single primary occupant with a conferencing occupancy of between three and four people.

Figures 24, 25:
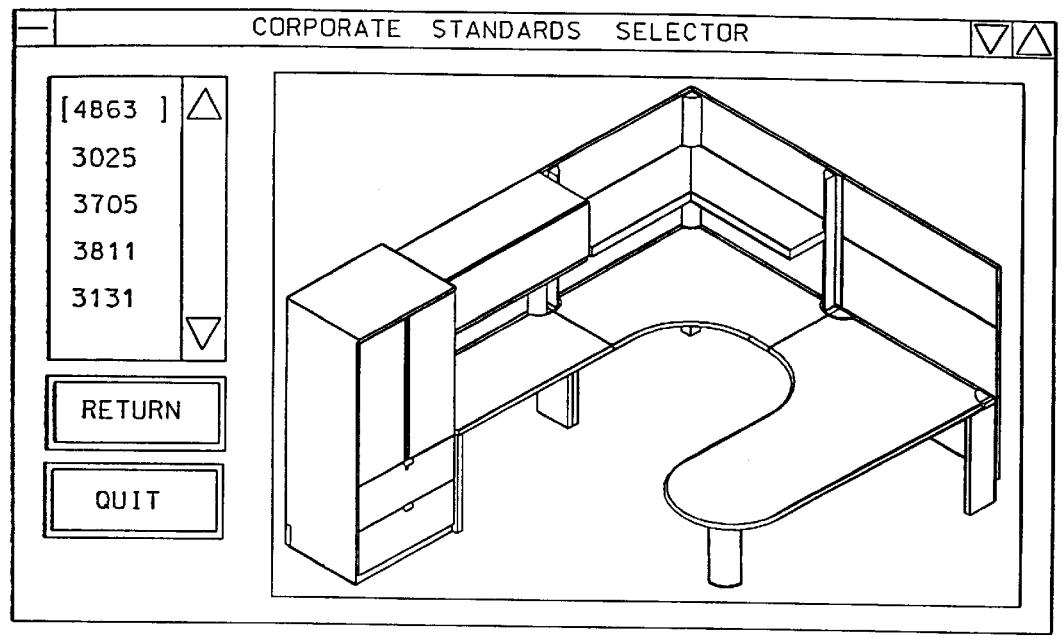
FIG. 24 illustrates a selector menu to select product clusters.
FIG. 25 is a display screen for prompting the user for customer and shipping information.

At step 356, for each cluster that matched the search parameters, the total cluster price (from the data field 134 of FIG. 7 in each of the clusters located) is displayed on the display device 28. At step 358, the user selects one of the total cluster prices from the list (e.g. by clicking the mouse on it), and at step 360, the visual appearance of the cluster corresponding to the price selected by the user is displayed, as shown in FIG. 24.

The cluster is displayed (by displaying each individual product of the cluster) by: 1) finding the cluster record 100 (FIG. 6) having the same cluster cell name (in data field 102) as the cluster cell name in data field 112 of the cluster search table 110 (FIG. 7) for the selected cluster (i.e. the cluster having the price selected in step 358); 2) retrieving for that cluster record 100 all of the cell names and corresponding x-y and angular position data stored in data fields 104a–104c; and 3) displaying each product in the cluster based on: a) the graphics data in the data field 74 (FIG. 3), and b) the position information retrieved during step 2), for each cell name (in data field 72) which matches a cell name taken from the cluster cell of FIG. 6.

At step 361 of FIG. 13, if the user wishes to incorporate the displayed cluster into the project, the program branches to steps 362 and 364, where the angular and x-y positions of the selected cluster are specified by the user in the manner described above. If the user wishes to view a cluster corresponding to another price as determined at step 361, the program branches back to step 358, where the user may select a different cluster price.

At step 366, the project file 230 of FIG. 9 is updated to reflect the fact that the user has selected the cluster for inclusion in the project being specified. This update is accomplished in the following manner: 1) the cell name of the first product in the cluster is retrieved from the data field 104a of FIG. 6; 2) the product database 40 of FIG. 2 is searched to find the product with the data field 42 having the same cell name; 3) the data fields 44–66 corresponding to that product are stored in the corresponding data fields in the project file 230 (FIG. 9); and 4) steps 1) through 3) above are repeated for each of the cell names set forth in the data fields 104a of FIG. 6 for the selected cluster.

At step 368 of FIG. 13, the graphics file 300 (FIG. 10) is updated so that each product that is part of the newly selected cluster will be displayed along with the other specified products. This update is accomplished in the following manner: 1) the cell name of the first product in the cluster is retrieved from the data field 104a of FIG. 6; 2) a new data record 302 is added to the graphics file 300 of FIG. 10, the cell name of the new data record 302 being the same as the cell name retrieved in step 1); 3) the x-y location of the product in the new data field 306 is specified as the sum of: a) the relative x-y location (i.e. the x-y location of that product within the cluster) stored in data field 104b for the first product in FIG. 6 and b) the absolute x-y location specified by the user at step 364 of FIG. 13; 4) the angular position of the product in the new data field 308 is specified as the sum of: a) the relative angular position (i.e. the angular position of that product within the cluster) stored in data field 104c for the first product in FIG. 6 and b) the absolute angular position specified by the user at step 362 of FIG. 13; and 5) steps 1) through 4) above are repeated for each of the cell names set forth in the data fields 104a of FIG. 6 for the selected cluster.

It should be noted that after a cluster is selected and placed by the user, the project and graphics files 230, 300 are updated, i.e. by providing a separate data record for each product in the cluster, so that the specified cluster is not recognized by the system as a single entity, but rather as a number of individual products.

Referring back to FIG. 13, if the user wishes to place the same cluster at another location as determined at step 370, the program branches to step 362. If the user wishes to select a different cluster from the same search, as determined at step 372, the program branches back to step 358. If the user wishes to perform a new cluster search as determined at step 374, the program branches back to step 352.

Deletion of Products

Figure 15:
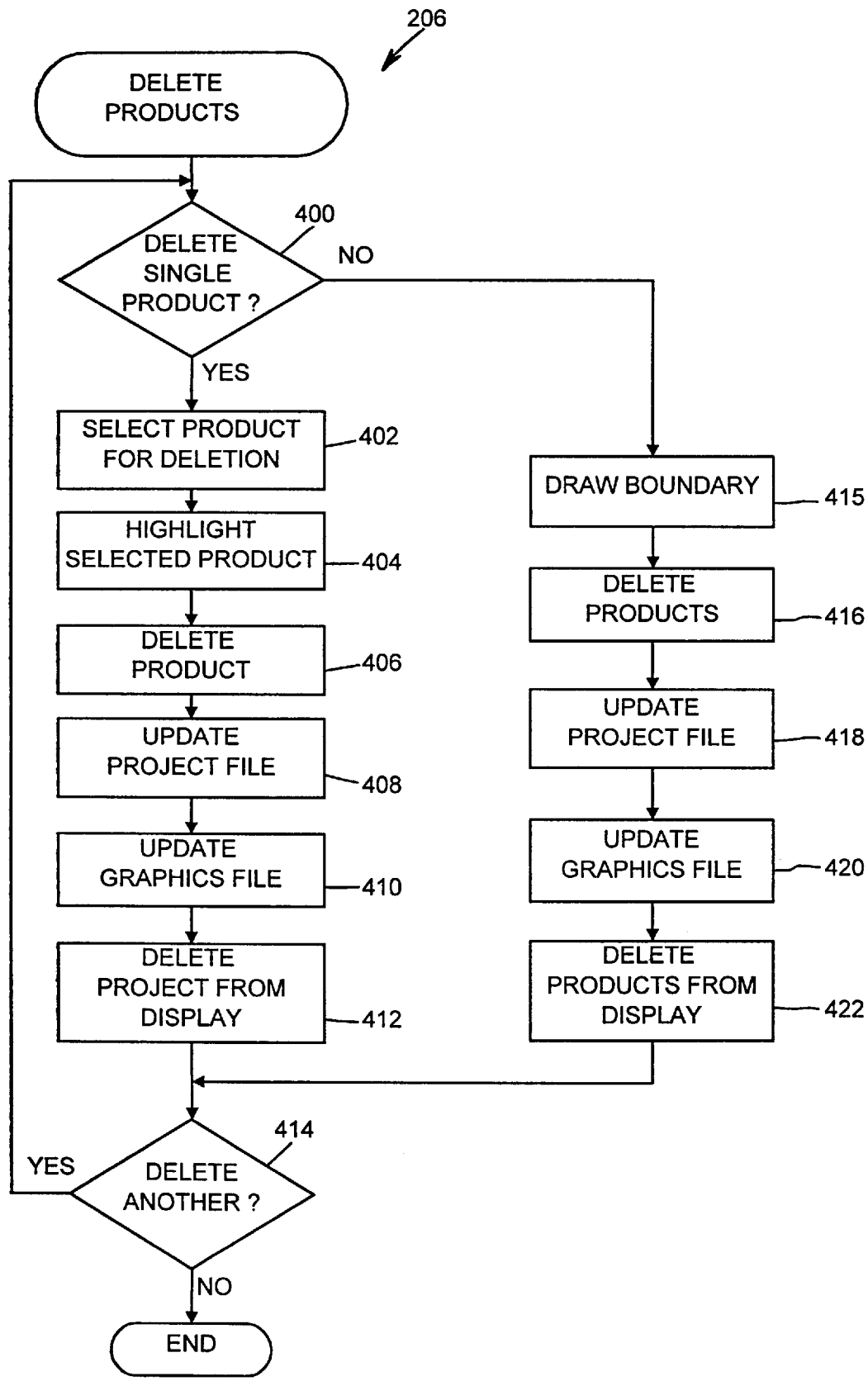
FIG. 15 is a flowchart of the "delete products" routine shown schematically in FIG. 8.

A flowchart of the delete-products routine 206 shown schematically in FIG. 8 is illustrated in FIG. 15. This routine 206 allows the user to delete either individual products or groups of products from the project.

Referring to FIG. 15, if the user wishes to delete a single product as determined at step 400, the program branches to step 402 where the user selects the product for deletion, for example, by positioning the mouse on the product displayed on the display device 28 and clicking once. At step 404, the product selected for deletion by the user is highlighted, for example, by showing it in a different color. At step 406, assuming the highlighted product is the product the user wishes to delete, the product is deleted, e.g. by clicking the mouse again (if the highlighted product is not to be deleted, the user can hit a reset key to return to step 400).

At step 408, the project file 230 of FIG. 9 is updated by deleting the data record 232 for the deleted product. At step 410, the graphics file 300 of FIG. 10 is updated by deleting the data record 302 for the deleted product, and consequently, at step 412, the product is the deleted from the display on the display device 28. If the user wishes to delete another product as determined at step 414, the program branches back to step 400.

If the user requested the deletion of a group of products as determined at step 400, the program branches to step 415 where the user draws an enclosed boundary around the group of products to be deleted. At step 416, the user deletes the products within the boundary, for example, by double-clicking the mouse. At step 418, the project file 230 of FIG. 9 is updated by deleting the product records for all products within the boundary drawn by the user. The ability to determine which products are within a closed boundary drawn by the user is provided by the CAD program, which is a conventional system commercially available from Bentley Microstation (the CAD program determines the cell number of each product within the boundary—the cell number is referred to as "MSLINK" in the CAD program; the product records 232 having those cell numbers (in their data fields 242) are deleted). At step 420, the graphics file 300 is updated by deleting the graphics records for all products within the boundary, and at step 422 the deleted products are removed from the display shown on the display device 28.

Assignment of Groups

To simplify and expedite the process of assigning finishes to the products selected for a project, the products can be divided into groups, and the finishes can be simultaneously applied to a number of products within the group. The product groups are defined by the user via the assign-groups routine 208 shown schematically in FIG. 8, a flowchart of which is shown in FIG. 16.

Figure 16:
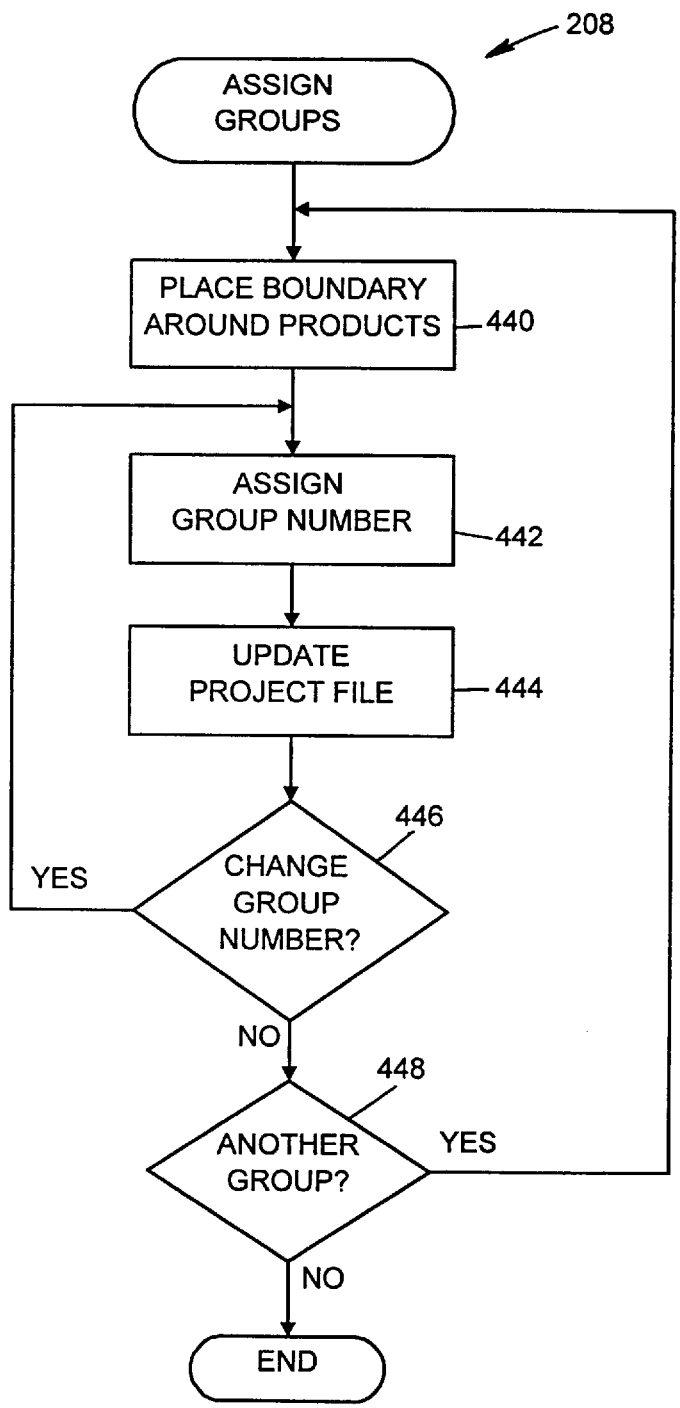
FIG. 16 is a flowchart of the "assign groups" routine shown schematically in FIG. 8.

Referring to FIG. 16, at step 440 the user places a boundary around a number of products which are to make up a group. After the boundary is drawn, at step 442 the user enters a group number. At step 444, the project file 230 is updated in the following manner. The cell number of each product within the boundary is determined by the CAD program. The product records 232 in the project file 230 are then searched to locate each product record 232 which has a cell number that was found to be within the boundary. The group number assigned by the user at step 442 (FIG. 16) is then stored in the data field 268 (FIG. 9) for each of those product records 232.

The group number assigned to the products within the boundary can be changed as determined at step 446, in which case the program branches back to step 442. If the user wishes to make another group of products as determined at step 448, the program branches back to step 440, where the user places a boundary around the products in the new group and then assigns a new group number to those products at step 442.

Assignment of Finishes

Figure 17:
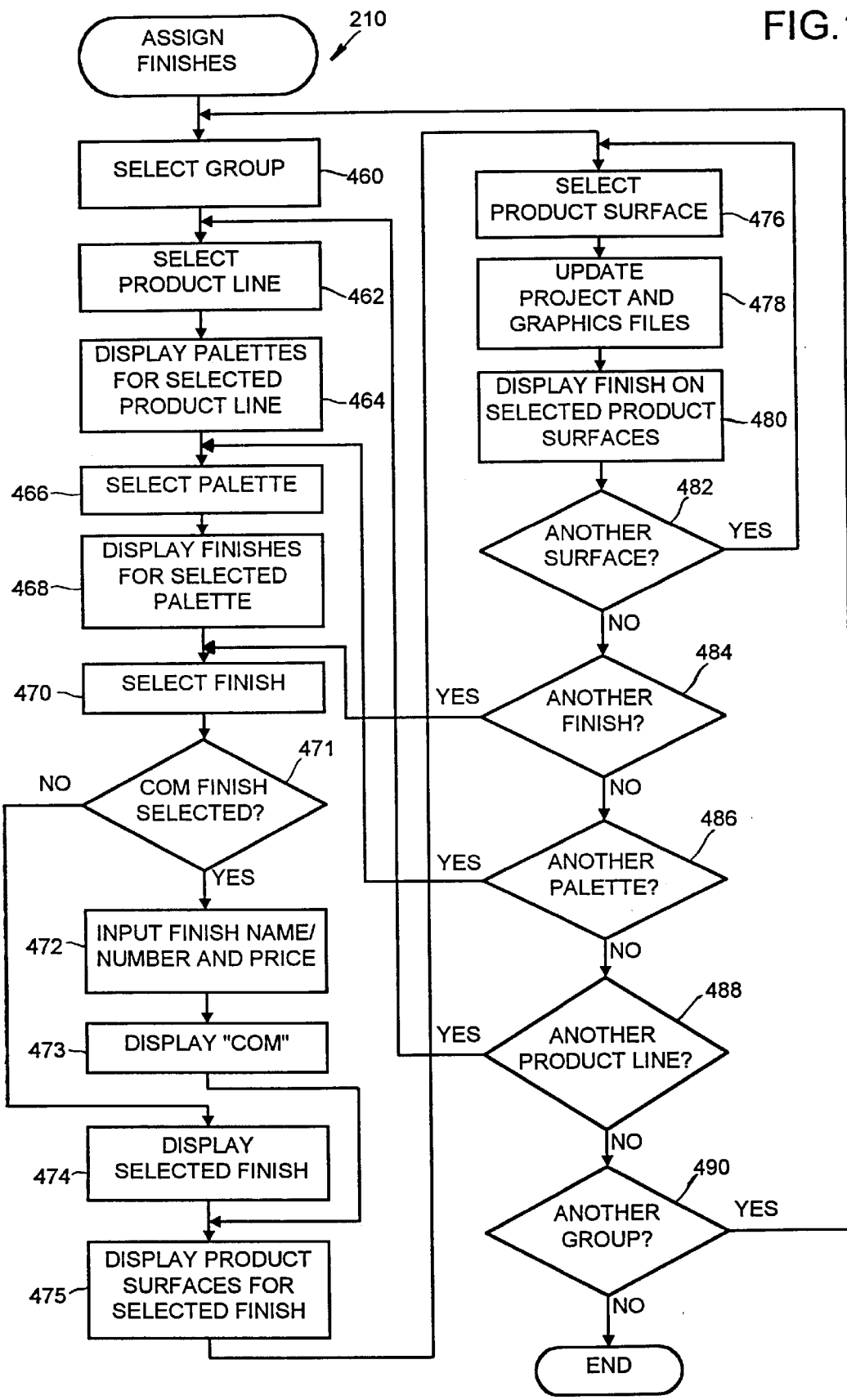
FIG. 17 is a flowchart of the "assign finishes" routine shown schematically in FIG. 8.

A flowchart of the assign-finishes routine 210 shown schematically in FIG. 8 is illustrated in FIG. 17. This routine 210 allows the user to assign finishes to the products that have been selected and which are displayed on the display device 28.

Referring to FIG. 17, at step 460 the user selects a group of products to which finishes are to be applied, the products having previously been grouped via the assign-groups routine 208. If the products have not been assigned to groups, then all products have the same group number (data field 268 in FIG. 9) and all products are considered to be within the same group. At step 462, the user selects one of the vendor product lines of the products that have been specified (and thus which are displayed on the display device 28). At step 464, the textual descriptions of the palettes that are available for the product line selected at step 462 are displayed on the display device 28 (the textual description of each palette is retrieved from the data field 92 shown in FIG. 5). At step 466, the user selects one of the palettes described on the display device 28, and at step 468 the textual description of each finish available in the palette selected at step 466 is displayed on the display device 28 (the finish descriptions are retrieved from the data fields 94 in FIG. 5 for each finish).

A number of finishes are displayed in the left-hand portion of the screen display shown in FIG. 18. The displayed finishes are from the palette described in the bottom left of FIG. 18 as "Walnut Wood." The entire list of finishes may be scrolled in a conventional manner using a pair of up and down arrows.

Referring back to FIG. 17, at step 470 the user selects one of the displayed finishes (e.g. via the mouse). If the user selects a COM (customer's own material) finish as determined at step 471, the program branches to step 472 where the user is prompted to input the name/number of the finish and its cost (since the system does not store such data for COM finishes), and at step 473, a rasterized image of "COM" is displayed on the display device 28 to indicate that a COM finish has been selected.

If the user did not select a COM finish as determined at step 471, the program branches to step 474, where the visual appearance of the selected finish is displayed in a rectangle or swatch (not shown) on the display device 28. Step 472 is accomplished by the CAD program, which displays the raster image of the finish based upon the finish codes stored in the data field 95 and the raster image file name stored in the data field 96 (FIG. 5).

At step 475, a list of the product surfaces to which the selected finish may be applied is displayed on the display device 28. This list, which is shown in the central portion of FIG. 18, is generated from the textual surface descriptions stored in the data fields 94a of FIG. 5. At step 476, the user selects one of the displayed product surfaces, after which the system 10 automatically applies the selected finish to all of the selected surfaces of the products within the selected group and product line (if a COM finish was selected, the rasterized image of "COM" is displayed since the system does not store rasterized images of COM finishes).

In assigning the selected finish, the system 10 updates the project and graphics files 230, 300 at step 478 and displays at step 480 the selected finish on the selected products shown on the display device 28. The update of the project file 230 is performed by: 1) searching the project file of FIG. 9 to find all product records 232 which have: a) the selected product line (specified in data field 246), b) the selected group number (specified in data field 268), and c) the surface code corresponding to the selected product surface (specified in data field 262); and 2) for each product record 232 found via step 1), storing in data field 264 the textual description of the selected finish and storing in data field 266 the incremental price for the selected finish.

The data fields 262, 264, 266 are multi-field data fields. The data stored in the data fields 264, 266 at step 2) above are stored in corresponding data locations, e.g. if the selected product surface code is in the third data location in the data field 262, the selected finish description and the incremental price are also stored in the third data location in their respective data fields 264, 266.

The incremental price stored in the data field 266 at step 2) above is determined by: 1) retrieving the finish grade code (data field 94c in FIG. 5) which corresponds to the selected product surface code (data field 94b); and 2) retrieving the incremental price (from one of the data fields 84b in FIG. 4) which corresponds to the finish grade code retrieved in step 1) above.

The update of the graphics file 300 at step 478 is performed by transferring, for each selected product surface, the raster image file name for the selected surface from data field 93c in FIG. 5 to data field 310a in FIG. 10 and the finish codes from data field 93b in FIG. 5 to the data field 310b in FIG. 10.

At step 480, the CAD program displays the selected finish on all of the selected product surfaces, utilizing the graphics file 300 in FIG. 10, so that the user is presented with the actual appearance of the specified products. The process of applying finishes to the products continues via steps 482–490, where the user can select another product surface to which the same finish is applied, another finish, another palette, another product line, and another group of products, respectively.

Assignment of Options

Figure 19:
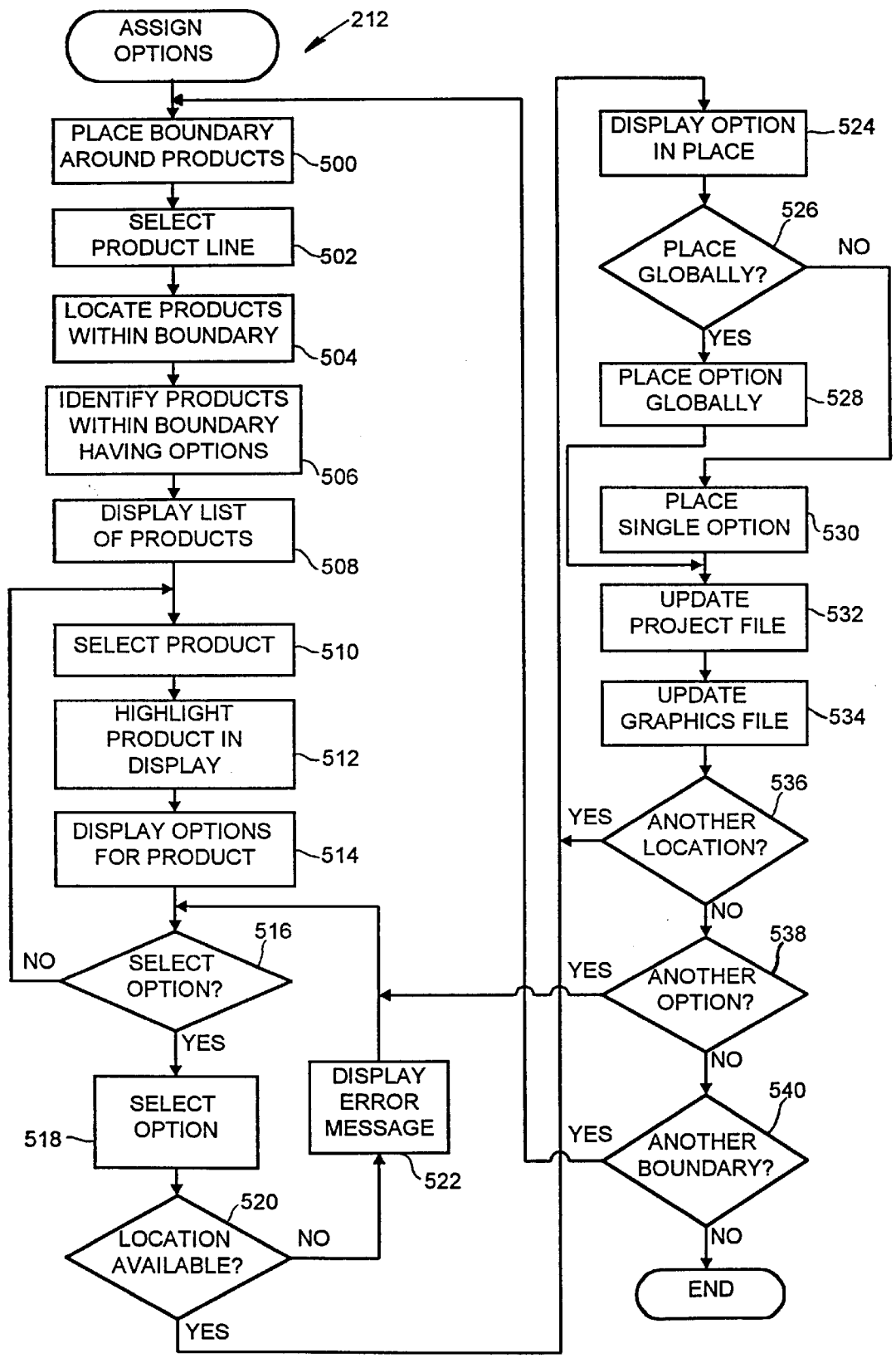
FIG. 19 is a flowchart of the "assign options" routine shown schematically in FIG. 8.

A flowchart of the assign-options routine 212 shown schematically in FIG. 8 is illustrated in FIG. 19. This routine 212 allows the user to assign options to the products that have been selected and which are displayed on the display device 28.

Referring to FIG. 19, at step 500 the user draws a boundary around the products for which options are to be assigned. At step 502, the user selects one of the product lines of the products that have been specified (and thus which are displayed on the display device 28). At step 504, the CAD program determines the cell numbers of the products located within the boundary drawn by the user at step 500. At step 506, the products within the boundary that may receive options are identified by searching the project file 230 to identify product records 232 which have a cell number (data field 242) within the boundary as determined at step 504 and option cells (data field 270). A list of the products found at step 506 is displayed on the display device 28 at step 508 (based on the textual product descriptions in the data fields 250 of FIG. 9). An exemplary display of a product listing for the product line "Teamwork" is shown in the left-hand portion of FIG. 20.

At step 510, the user selects one of the listed products, and at step 512 the visual display of the product (i.e. the three-dimensional display) is highlighted, such as by making it a different color. At step 514, a textual description of the options available for the highlighted product are displayed on the display device 28. These option descriptions, which are illustrated in the right-hand portion of FIG. 20, are retrieved from the data field 272 in FIG. 9.

If the user wishes to select one of the options as determined at step 516, the program branches to step 518 where the user selects the desired option. If there is not a location available for the option as determined at step 520, the program branches to step 522 where a suitable error message is displayed. One example in which no location would be available for an option would be a cabinet which may be provided with a maximum of three shelves as options, and for which all three shelves have already been placed.

At step 524, a visual display of the option in place on the highlighted product is generated. If the option is to be placed globally as determined at step 526, the user places the option globally (on all of the selected products in the project that can accommodate the selected option), for example, by clicking the mouse on a display box entitled "Global." Otherwise, at step 530, the user selects the option for placement on the single highlighted product on which it was displayed at step 524.

At step 532, the project file 230 is updated by creating either a single new product record 232 if a single option was placed at step 530, or a plurality of new product records 232 if the option was placed globally on a plurality of products. Each product record 232 is created by copying the contents of the data record 41 from the product database 40 (FIG. 2) having the cell name corresponding to the selected option (some of the data fields may not be used for an option, such as the data fields 62–66) into a new product record 232. The new product record 232 is then assigned a unique cell number (in data field 242 of FIG. 9) by the CAD program and a parent code (in data field 274) which identifies the product for which the option has been selected.

At step 534, the graphics file 300 of FIG. 10 is updated by appending a new graphics record 302 for each option placed at steps 528 or 530. The x-y and angular positions of the option (for data fields 306 and 308 in FIG. 10) are determined based upon the x-y and angular positions of the product on which the option was placed.

The process of assigning options to the products continues via steps 536–540, where the user can select another location for the placement of the selected option, another option for placement, and another boundary, respectively.

Assignment of Key Information

Figure 21:
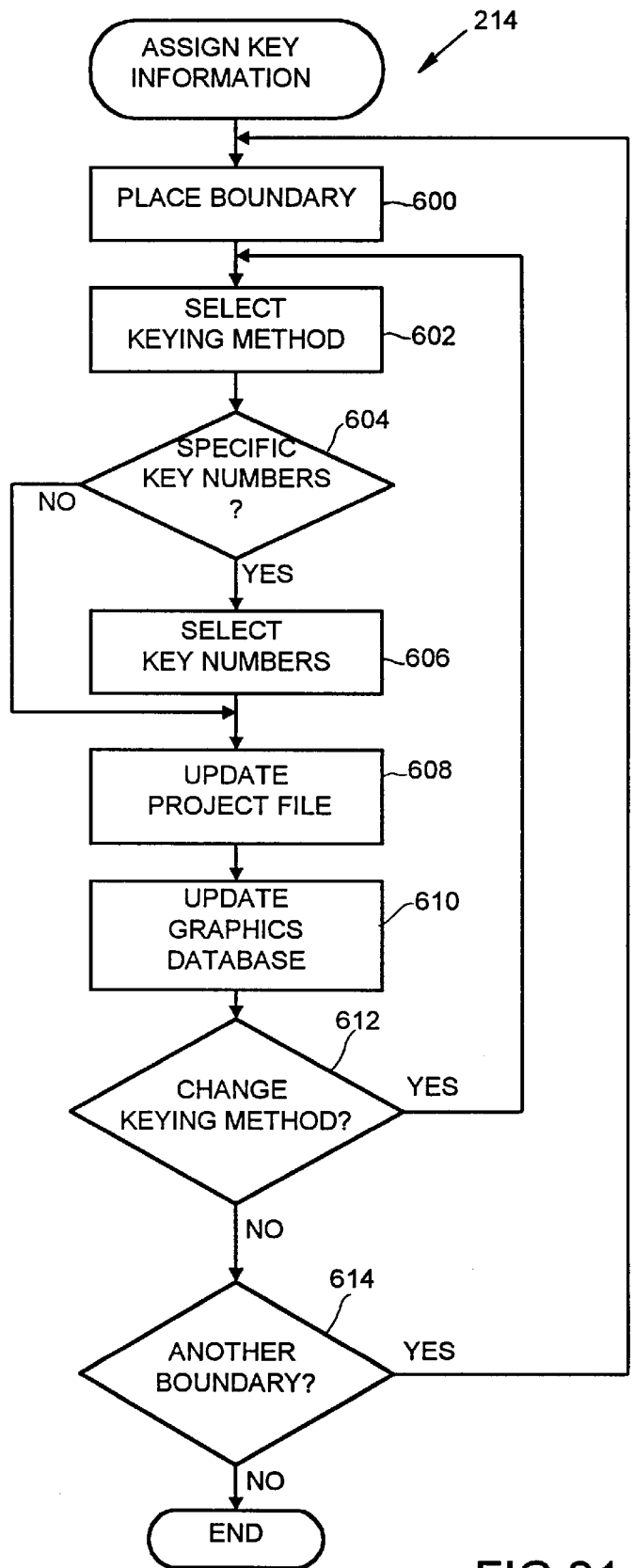
FIG. 21 is a flowchart of the "assign key information" routine shown schematically in FIG. 8.

A flowchart of the assign key information routine 214 shown schematically in FIG. 8 is illustrated in FIG. 21. This routine 214 allows the user to assign keying methods and key numbers to the selected products for which locks may be provided.

Referring to FIG. 21, at step 600 the user places a boundary around the products for which key information is to be assigned. At step 602, the user selects, for the products within the boundary, a keying method from a number of predetermined keying methods, such as consecutive key numbers, random key numbers, specific key numbers, etc. If the selected keying method is specific key numbers as determined at step 604, the program branches to step 606, where the user selects, for each product within the boundary, a specific key number from a number of predetermined key numbers.

At step 608, the project file 230 is updated by storing in the data record 232 for each product within the boundary, the keying method selected at step 602 (which is stored in data field 278 of FIG. 9) and the key number selected at step 606 (which is stored in data field 280).

At step 610, the graphics file 300 is updated by storing, in the data field 312 for each product within the boundary, a textual message indicating that the product has been assigned a keying method, which results in that textual message being displayed on the display device 28 for each of the products. For example, each of the textual messages could be a keying method selected at step 602 or a key number selected at step 606.

At step 612, if the user wishes to change the keying method, the program branches to step 602 where another keying method may be selected. At step 614, if the user wishes to place a boundary around another group of products, the program branches to step 600.

Assignment of Destination Tags

Figure 22:
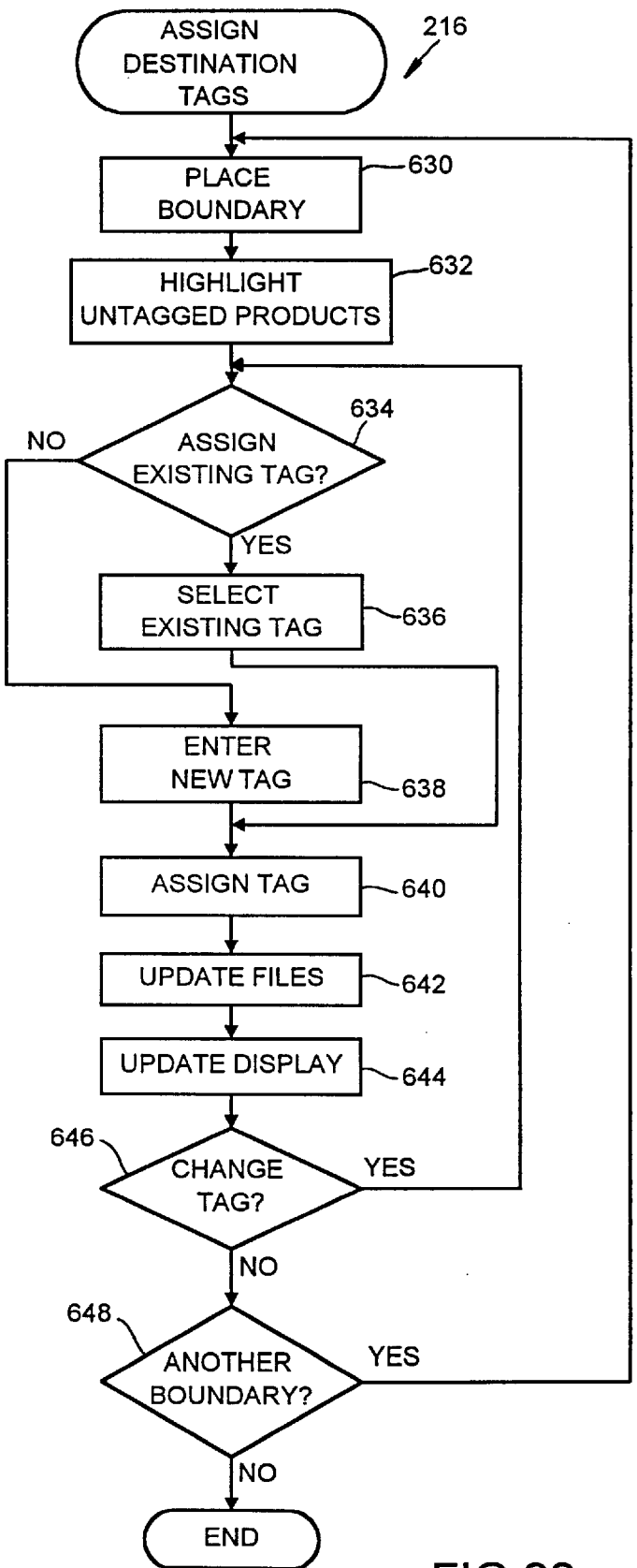
FIG. 22 is a flowchart of the "assign destination tags" routine shown schematically in FIG. 8.

A flowchart of the assign destination tags routine 216 shown schematically in FIG. 8 is illustrated in FIG. 22. This routine 216 allows the user to assign destination tags to the selected products to specify the various locations, such as specific offices or conference rooms, to which the products are to be delivered.

Referring to FIG. 22, at step 630, the user places a boundary around the products which are to be assigned a common destination tag. At step 632, any untagged products displayed on the display device 28 within the boundary are highlighted, for example, by showing them in a different color. At step 634, if the user wishes to assign an existing tag, the program branches to step 636 where the user selects one existing tag from a list of all the existing tags. If the user wishes to assign a new tag, the program branches from step 634 to step 638, where the user enters the new tag. At step 640, the selected tag is assigned to all products within the boundary.

At step 642, the project and graphics files 230, 300 are updated. The project file 230 is updated by storing in data field 256, for each product within the boundary, the tag assigned at step 640. The graphics file 300 is updated by storing in one of the data fields 312, for each product within the boundary, the destination tag assigned at step 640.

At step 644, the display on the display device 28 is updated by displaying the newly assigned destination tags on their respective products and de-highlighting the previously untagged products which were just tagged. At step 646, if the user wishes to change the tag just assigned, the program branches to step 634, and at step 638, if the user wishes to place a boundary around another group of products, the program branches to step 630.

Generation of Cost Specifications

Figure 23:
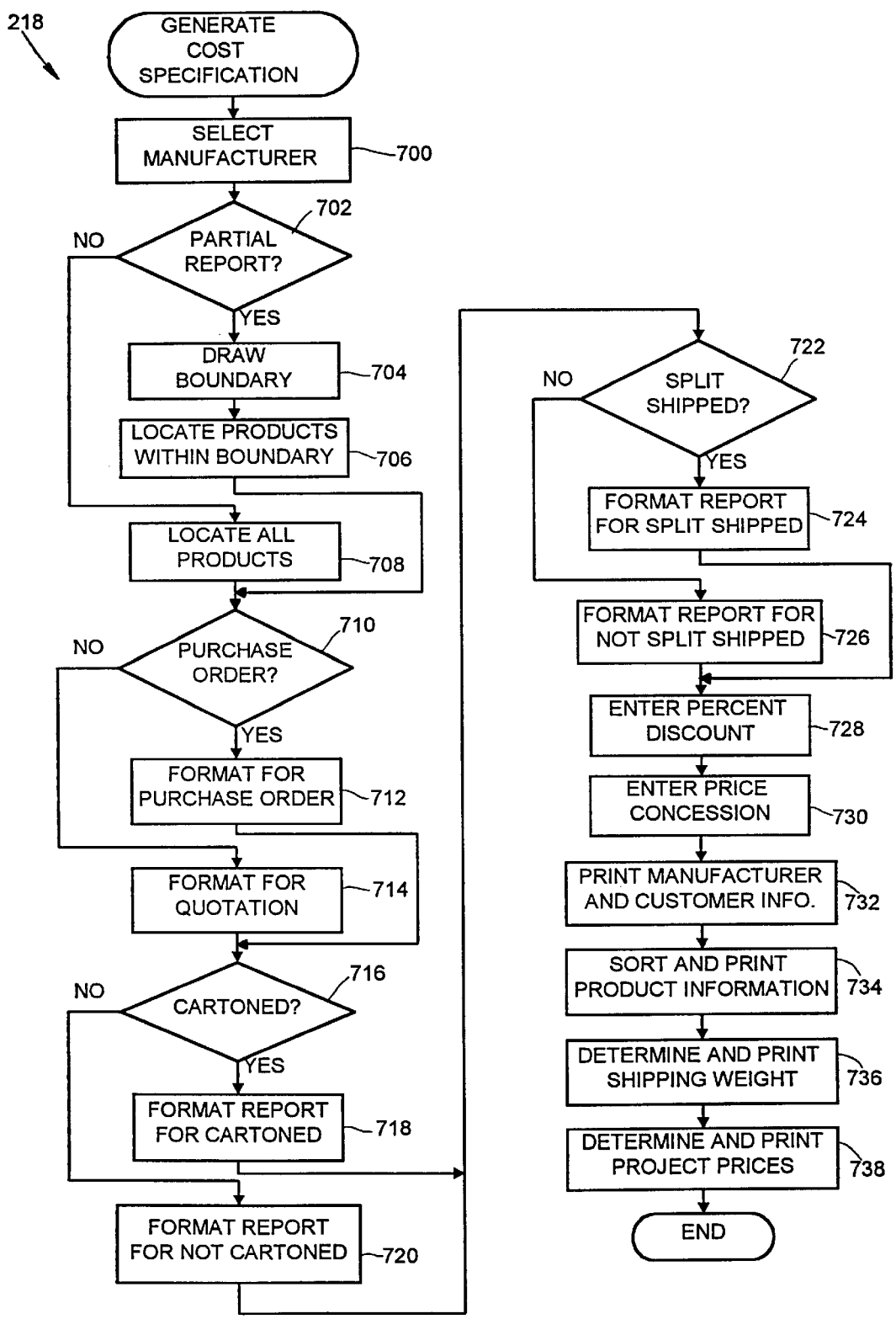
FIG. 23 is a flowchart of the "generate cost specification" routine shown schematically in FIG. 8.

A flowchart of the generate cost specification routine 218 shown schematically in FIG. 8 is illustrated in FIG. 23. This routine 218 allows the user to generate written cost specifications, such as quotations and purchase orders, for furniture projects, or portions of furniture projects, that have been specified.

Referring to FIG. 23, at step 700 the user selects the manufacturer for which the written cost specification is to be generated. At step 702, if the user wishes to generate a cost specification for only a portion of the furniture products for a project, i.e. a partial report, the program branches to step 704 where the user draws a boundary around the products to be included in the cost specification. At step 706, the system 10 locates the products within the boundary and which have the manufacturer selected at step 700 (determined by searching the data field 244 (FIG. 9) for each product within the boundary). If the user did not select a partial report as determined at step 702, at step 706 all the products of the selected manufacturer are located.

At step 710, if the user wishes to generate a purchase order, the program branches to step 712 where the cost specification is formatted for a purchase order. Otherwise, the cost specification is formatted for a quotation at step 714. At step 716, if the products are to be shipped in cartons, the cost specification is formatted for cartoned shipment at step 718; otherwise the specification is formatted for no cartons at step 720.

At step 722, if the project is to be split-shipped, the specification is formatted for split shipment at step 724, or else formatted for no split shipment at step 726. At this point, the data field 260 (FIG. 9) for each of the products within the boundary is updated to indicate whether they are to be split-shipped or not.

At step 728, the user enters a percent discount (if any) for the entire project, and at step 730 a price concession (i.e. a price adjustment from a previous purchase order) is entered (if any).

At step 732, the manufacturer and customer information is printed on the purchase order or quotation (e.g. company names, addresses, and shipping addresses—based on information previously entered by the user when filling out the form shown in FIG. 25). At step 734, information regarding the products for which the cost specification is being generated is sorted and printed. For each product, this information includes a description of the product (from data fields 246–250 of FIG. 9), the destination tag for the product (from data field 256), the gross list price of the product (the base price from data field 252 plus any incremental carton price from data field 258), the finishes selected for the product (from data fields 262, 264), any incremental prices for the finishes (from data field 266), a description of the options selected for the product (from data field 272), and the keying method and key number (if any) (from data fields 278, 280).

At step 736, the shipping weight is determined and printed on the cost specification. The total shipping weight is determined by adding the individual shipping weight for each product as specified in the data field 254 of FIG. 9.

At step 738, the project prices are determined, such as the gross project price, net project price, and adjusted net project price. The gross price is determined by summing all the prices associated with each product (from data fields 252, 258, and 266). The net price is determined by multiplying the gross price by the percent discount entered at step 728 and subtracting the resulting product from the gross price. The adjusted net price is determined by subtracting the price concession (if any) entered at step 730 from the net price.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A furniture specification system, comprising:

means for storing a first set of data representing a plurality of available furniture products, a second set of data representing a plurality of product clusters, each of said product clusters including a plurality of different types of furniture products, and a third set of data representing a stored value for each of a plurality of furniture attributes for each of said product clusters;

means for generating a furniture specification which specifies a plurality of said available furniture products, said means for generating a furniture specification comprising:

means for prompting a user to input an upper value and a lower value for one of said furniture attributes;

means for searching said storing means to locate each of said product clusters for which said stored value for said one furniture attribute input by the user is within a range defined by said upper and lower values for said one furniture attribute input by the user; and means for generating a visual display to the user which identifies each of said product clusters located by said searching means;

means for generating a visual display of said furniture products specified by said furniture specification on a display device; and means for generating a cost specification based upon said furniture specification.

2. A system as defined in claim 1 wherein one of said product clusters includes a desk, a desk chair, and a credenza.

3. A system as defined in claim 2 wherein said office space comprises a single substantially enclosed office.

4. A system as defined in claim 1 wherein one of said product clusters includes a conference table and at least one conference table chair.

5. A system as defined in claim 1 wherein one of said product clusters includes at least one desk unit and at least one storage unit.

6. A system as defined in claim 1 wherein said prompting means comprises means for prompting the user to input cost information and a value specifying a number of primary occupants for an office.

7. A system as defined in claim 1 wherein said prompting means comprises means for simultaneously displaying a plurality of furniture attributes.

8. A system as defined in claim 1 wherein said means for generating a visual display to the user which identifies each of said product clusters located by said searching means comprises means for displaying cost information for each of said product clusters located by said searching means.

9. A system as defined in claim 1 wherein said means for generating a visual display to the user which identifies each of said product clusters located by said searching means comprises means for displaying a visual representation of each of said product clusters located by said searching means.

10. A system as defined in claim 1 additionally comprising:

means for allowing the user to select one of said product clusters located by said selecting means; and means for allowing the user to delete one of said products of said product cluster selected by the user.

11. A system as defined in claim 1 wherein said means for generating a furniture specification comprises means for generating a furniture specification for a plurality of offices, said furniture specification specifying at least one furniture item for each of said offices.

12. A system as defined in claim 1 wherein said furniture specification includes, for each of said furniture products, a data record comprising:

data specifying a furniture item type for said furniture item;

data specifying a plurality of characteristics of said furniture item; and data specifying the cost of said furniture item.

13. A furniture specification system, comprising:

means for generating a furniture specification which specifies a plurality of furniture products, said generating means comprising:

means for allowing a user to select a plurality of furniture products specified by said furniture specification;

means for allowing a user to select a furniture option for said plurality of furniture products selected by the user; and means for automatically assigning said furniture option to said plurality of furniture products selected by the user so that said furniture option is included in said furniture specification;

means for generating a visual display of said furniture products specified by said furniture specification on a display device; and means for generating a cost specification based upon said furniture specification.

14. A system as defined in claim 13 wherein said means for allowing a user to select a plurality of furniture products comprises means for allowing the user to generate a boundary around a plurality of furniture products displayed on said display device.

15. A system as defined in claim 13 wherein said means for generating a furniture specification comprises means for generating a furniture specification for a plurality of offices, said furniture specification specifying at least one furniture item for each of said offices.

16. A system as defined in claim 13 wherein said means for generating a visual display of said furniture products generates a visual display of said furniture option for each of said products for which said furniture option was assigned.

* * * * *